United States Patent
Joshi et al.

(10) Patent No.: US 11,146,788 B2
(45) Date of Patent: Oct. 12, 2021

(54) GROUPING PALETTE BYPASS BINS FOR VIDEO CODING

(71) Applicant: QUALCOMM Incorporated, San Diego, CA (US)

(72) Inventors: Rajan Laxman Joshi, San Diego, CA (US); Vadim Seregin, San Diego, CA (US); Wei Pu, Pittsburgh, PA (US); Feng Zou, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

(21) Appl. No.: 15/177,201

(22) Filed: Jun. 8, 2016

(65) Prior Publication Data

US 2016/0373745 A1    Dec. 22, 2016

Related U.S. Application Data

(60) Provisional application No. 62/175,137, filed on Jun. 12, 2015.

(51) Int. Cl.
*H04N 19/119* (2014.01)
*H04N 19/186* (2014.01)
(Continued)

(52) U.S. Cl.
CPC ........... *H04N 19/119* (2014.11); *H04N 19/13* (2014.11); *H04N 19/159* (2014.11);
(Continued)

(58) Field of Classification Search
None
See application file for complete search history.

(56) References Cited

U.S. PATENT DOCUMENTS

| | | | |
|---|---|---|---|
| 6,748,116 B1 | 6/2004 | Yue | |
| 7,733,245 B2 | 6/2010 | Spencer | |

(Continued)

FOREIGN PATENT DOCUMENTS

| | | |
|---|---|---|
| CA | 2795620 A1 | 10/2011 |
| CN | 101217668 A | 7/2008 |

(Continued)

OTHER PUBLICATIONS

International Search Report and Written Opinion from International Application No. PCT/US2016/036572, dated Sep. 6, 2016, 14 pp.

(Continued)

*Primary Examiner* — Clifford Hilaire
(74) *Attorney, Agent, or Firm* — Shumaker & Sieffert, P.A.

(57) ABSTRACT

An example method of coding video data includes coding, from a coded video bitstream, a syntax element that indicates whether a transpose process is applied to palette indices of a palette for a current block of video data; decoding, from the coded video bitstream and at a position in the coded video bitstream that is after the syntax element that indicates whether the transpose process is applied to palette indices of the palette for the current block of video data, one or more syntax elements related to delta quantization parameter (QP) and/or chroma QP offsets for the current block of video data; and decoding the current block of video data based on the palette for the current block of video data and the one or more syntax elements related to delta QP and/or chroma QP offsets for the current block of video data.

24 Claims, 7 Drawing Sheets

(51) Int. Cl.

| | |
|---|---|
| *H04N 19/91* | (2014.01) |
| *H04N 19/176* | (2014.01) |
| *H04N 19/70* | (2014.01) |
| *H04N 19/13* | (2014.01) |
| *H04N 19/159* | (2014.01) |
| *H04N 19/184* | (2014.01) |

(52) U.S. Cl.
CPC ......... *H04N 19/176* (2014.11); *H04N 19/184* (2014.11); *H04N 19/186* (2014.11); *H04N 19/70* (2014.11); *H04N 19/91* (2014.11)

(56) References Cited

U.S. PATENT DOCUMENTS

| | | |
|---|---|---|
| 9,538,172 B2 | 1/2017 | Chien et al. |
| 2008/0246637 A1 | 10/2008 | Chen et al. |
| 2010/0214577 A1 | 8/2010 | Owen |
| 2011/0280306 A1 | 11/2011 | Zheludkov et al. |
| 2011/0317704 A1 | 12/2011 | Brown et al. |
| 2012/0082244 A1 | 4/2012 | Chen et al. |
| 2012/0163452 A1 | 6/2012 | Horowitz |
| 2012/0177107 A1 | 7/2012 | Fu et al. |
| 2012/0230417 A1 | 9/2012 | Rojals et al. |
| 2012/0294353 A1 | 11/2012 | Fu et al. |
| 2013/0266060 A1 | 10/2013 | Budagavi |
| 2013/0272389 A1 | 10/2013 | Sze et al. |
| 2014/0185665 A1 | 7/2014 | Pu et al. |
| 2014/0192861 A1 | 7/2014 | Chuang et al. |
| 2014/0301474 A1 | 10/2014 | Guo et al. |
| 2014/0301475 A1 | 10/2014 | Guo et al. |
| 2015/0016501 A1 | 1/2015 | Guo et al. |
| 2015/0098513 A1 | 4/2015 | Fu et al. |
| 2015/0256857 A1 | 9/2015 | Joshi et al. |
| 2017/0374372 A1* | 12/2017 | Liu ................. H04N 19/186 |

FOREIGN PATENT DOCUMENTS

| | | | |
|---|---|---|---|
| CN | 104104951 A | 10/2014 | |
| JP | 2018514142 A | 5/2018 | |
| TW | I353181 B | 11/2011 | |
| TW | I355204 B | 12/2011 | |
| WO | 2012045269 A1 | 4/2012 | |
| WO | 2013154939 A1 | 10/2013 | |
| WO | 2014084109 A1 | 6/2014 | |
| WO | 2015006724 A3 | 3/2015 | |
| WO | WO-2016123388 A1 * | 8/2016 | ........... H04N 19/176 |

OTHER PUBLICATIONS

Joshi, et al., "Comment on Signalling the Palette Transpose Flag After Last Palette Run Type Flag (JCTVC-U0090)", JCT-VC Meeting; Jun. 19-26, 2015; Warsaw, PL; (Joint Collaborative Team on Video Coding of ISO! IEC JTC1/SC29NVG11 and ITU-T SG.16 ); URL:HTTP://WFTP3.ITU.INT/AV-ARCH/JCTVC-SITE/, No. JCTVC-U0133,Jun. 15, 2015, XP030117576, 4 pp.

Joshi, et al., "HEVC Screen Content Coding: Draft 1," JCT-VC Meeting; Jun. 30-Jul. 9, 2014; Sapporo, JP; (Joint collaborative Team on Video Coding of ISO/IEC JTC1/SC291WG11 and ITU-T SG.16); URL: HTTP://WFTP3.1TU.INT/AV-ARCH/JCTVC-SITE/, no. JCTVC-R1005-v2, Aug. 23, 2014, XP030116694, pp. 1-70, 361 pp.

Joshi, et al., "HEVC Screen Content Coding Draft Text 3", JCT-VC Meeting; Feb. 10-18, 2015; Geneva, CH; (Joint Collaborative Team on Video Coding of ISO/IEC JTC1/SC29NVG11 and ITU-T SG.16); URL: HTTP://WFTP3.ITU.INT/AV-ARCH/JCTVC-SITE/, no. JCTVC-T1005, Feb. 22, 2015, XP030117412, 335 pp.

Joshi, et al., "HEVC Screen Content Coding Draft Text 4", JCT-VC Meeting; Jun. 19-26, 2015; Warsaw, PL; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,No. JCTVC-U1005-v2, Sep. 5, 2015, XP030117647, 636 pp.

Sole, et al., "Non-CE6: Delta QP Signalling for Palette", JCT-VC Meeting; Oct. 17-24, 2014; Strasbourg; FR; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-S0043-v5, Oct. 22, 2014, XP030116772, 3 pp.

Ye, et al.,"CE1-Related: Palette Mode Context and Codeword Simplification", JCT-VC Meeting; Jun. 19-26, 2015; Warsaw, PL; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/, No. JCTVC-U0090, Jun. 10, 2015, XP030117516, 6 pp.

Sullivan et al., "Meeting report of the 21st meeting of the Joint Collaborative Team on Video Coding (JCT-VC), Warsaw, PL, Jun. 19-26, 2015", 21. JCT-VC Meeting; Jun. 19-26, 2015; Warsaw, PL; (Joint Collaborative Team on Video Coding of ISO/IEC JTC1/SC29/WG11 and ITU-T SG.16 ); JCTVC-U1000, Dec. 1, 2015, 127 pp.

Karczewicz et al., "Palette Mode for Screen Content Coding", 13th JCT-VC Meeting, Apr. 18-26, 2013, Incheon, KR, Apr. 18 through 23, 2013, (Joint Collaborative Team on Video Coding of ISO/IEC JTC1/SC29/WG11 and ITU-T SG.16 ); JCTVC-M0323, Apr. 8, 2013, 5 pp.

Karczewicz et al., "Palette Mode for Screen Content Coding", 13th JCT-VC Meeting, Apr. 18-26, 2013, Incheon, KR, Apr. 18 through 23, 2013, (Joint Collaborative Team on Video Coding of ISO/IEC JTC1/SC29/WG11 and ITU-T SG.16 ); JCTVC-M0323_r1, Apr. 17, 2013, 6 pp.

Karczewicz et al., "Palette Mode for Screen Content Coding", 13th JCT-VC Meeting, Apr. 18-26, 2013, Incheon, KR, (Joint Collaborative Team on Video Coding of ISO/IEC JTC1/SC29/WG11 and ITU-T SG.16 ); JCTVC-V10323_r2, Apr. 20, 2013, 12 pp.

Wang et al., "High Efficiency Video Coding (HEVC) Defect Report 2", 15th Meeting, Oct. 23-Nov. 1, 2013, Geneva, CH ; (Joint Collaborative Team on Video Coding of ISO/IEC JTC1/SC291WG11 and ITU-T SG.16 ); JCTVC-O1003_v2, Nov. 24, 2013, 311 pp.

Flynn et al., "High Efficiency Video Coding (HEVC) Range Extensions text specification: Draft 7", 17th Meeting, Mar. 27-Apr. 4, 2014, Valencia, ES; (Joint Collaborative Team on Video Coding of ISO/IEC JTC1/SC29/WG11 and ITU-T SG.16 ); JCTVC-Q1005_v4, Apr. 10, 2014, 379 pp.

ITU-T 1- 265, Series H: Audiovisual and Multimedia Systems, Infrastructure of audiovisual services—Coding of moving video, Advanced video coding for generic audiovisual services, The International Telecommunication Union. Apr. 2015, 634 pp.

Guo et al., "RCE4: Summary report of HEVC Range Extensions Core Experiments 4 (RCE4) on palette coding for screen content", 16th Meeting, Jan. 9 through 17, 2014, San Jose, CA, USA; Joint Collaborative Team on Video Coding (JCT-VC) of ITU-T SG 16 WP 3 and ISO/IEC JTC 1/SC 29/WG 11, JCTVC-P0035, Jan. 9, 2014, 8 pp.

Response to First Written Opinion from corresponding PCT Application Serial No. PCT/US2016/036572 filed on Apr. 10, 2017 (29 pages).

Second Written Opinion from corresponding PCT Application Serial No. PCT/US2016/036572 dated May 9, 2017 (8 pages).

International Preliminary Report on Patentability from corresponding PCT Application Serial No. PCT/US2016/036572 dated Sep. 7, 2017 (26 pages).

Bross B., et al., "High Efficiency Video Coding (HEVC) Text specification draft 10 (for FDIS & Last Call)," Joint Collaborative Team on Video Coding (JCT-VC) of ITU-T SG 16 WP 3 and ISO/IEC JTC 1/SC 29/WG 11, Document JCTVC-L1003 v34, 12th Meeting, Geneva, CH, Jan. 14-23, 2013, 310 pages.

Bross B., et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, 8th Meeting San Jose, CA, USA, Feb. 1-10, 2012, 259 pp. 34, 54-55, 74-75, 90-98,220-224, URL: http://wftp3.itu.int/AV-ARCH/JCTVC-SITE/.

Bross B., et al., "High Efficiency Video Coding (HEVC) Text Specification Draft 8", Jul. 11-20, 2012, 10. JCT-VC Meeting, 101 MPEG Meeting, Stockholm; (Joint Collaborative Team On Video Coding of ISO/IEC JTC1/SC29/WG11 and ITU-T SG.16); URL:

(56) References Cited

OTHER PUBLICATIONS

HTTP://WFTP3.ITU.INT/AV-ARCH/JCTVC-SITE/ No. JCTVC-J1003_d7, XP0301 12947, pp. 197-201, section A.4.1 ,A.4.2, 260 Pages.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, p. 259.
Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pp.
Bross, et al., "Suggested bug-fixes for HEVC text specification draft 6," Document JCTVC-O030, Joint Collaborative Team on Video Coding (JCT-VC) of ITU-T SG16 WP3 and ISO/IEC JTC1/SC29/WG11, 9th Meeting: Geneva, CH, 27 Apr.-May 7, 2012, 270 pages.
Bross, et al., "WD4: Working Draft 4 of High-Efficiency Video Coding," JCTVC-F803 d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chang, "A Novel Pipeline Architecture for H.264/AVC CABAC Decoder", IEEE Asia Pacific Conference on Circuits and Systems, APCCAS, Nov. 30, 2008-Dec. 3, 2008, pp. 308-311.
Chien, et al., "Last position coding for CABAC," JCTVC-G704, 7th Meeting: Geneva, Nov. 21-30, 2011, 4 pages.
Chien, W-J., et al., "Intra mode coding for INTRA NxN", 9. JCT-VC Meeting; 100. Mpeg Meeting; Apr. 27, 2012 -Jul. 5, 2012; Geneva; (Joint Collaborative Team on Video Coding of ISO/IEC JTC1/SC29/WG11 and ITU-T SG.16) URL: HTTP://WFTP3.ITU.INT/AV-ARCH/JCTVC-SITE/ No. JCTVC-I0302, Apr. 17, 2012 (Apr. 17, 2012), XP030112065, abstract section 1. "Introduction", section 2.2 "Bypass grouping for INTRA NxN".
Chuang T-D., etaL, "Non-CE1: Codeword reordering for last_significant_coeff_x and last_significant coeff_y", 7. JCT-VC Meeting; 98. MPEG Meeting; Nov. 21, 2011-Nov. 30, 2011; Geneva; (Joint Collaborative Team On Mideo Coding of Iso/Iec JTC1/SC29/WG11 and ITU-TSG.16); URL: HTTP://WFTP3.1TU.INT/AV-ARCH/JCTVC-SITE/, No. JCTVC-G201, Nov. 7, 2011 (Nov. 7, 2011), XP030110185.
Fu C-M., et al., "CE13: Sample Adaptive Offset with LCU-Independent Decoding," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E049, 6 pages.
Fu C-M., et al., "Non-CE1: Bug-fix of offset coding in SAO interleaving mode", 9. JCT-VC Meeting; 100. MPEG Meeting; Apr. 27, 2012-Jul. 5, 2012; Geneva; (Joint Collaborative Team On Video Coding of ISO/IEC JTC1/SC29/WG11 and ITU-TSG.16); URL: HTTP://WFTP3.1TU.INT/AV Arch/Jctvc-Site/, No. JCTVC-10168, Apr. 16, 2012 (Apr. 16, 2012), XP030111931.
Huang, et al., "BoG report on integrated text of SAO adoptions on top of JCTVC-10030," Document: JCTVC-10602, Joint Collaborative Team on Video Coding (JCT-VC) of ITU-T SG16 WP3 and ISO/IEC JTC1/SC29/WG11, 9th Meeting: Geneva, CH, 27 Apr.-May 7, 2012, pp. 1-2.
ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.
ITU-T H.265, Series H: Audiovisual and Multimedia Systems, Infrastructure of Audiovisual Services—Coding of Moving Video, High Efficiency Video Coding, The International Telecommunication Union, Apr. 30, 2013, 317 Pages (pp. 227-228,231, 237-241,
250-251, 276-278), Retrieved from the Internet: https://www.itu.int/rec/dologin_pub.asp? ang-e&id-H.265-201304-S!!PDF-E&type-items.
Joshi R., et al., "HEVC Screen Content Coding Draft Text 1", 18. JCT-VC Meeting; Jun. 30, 2014-Sep. 7, 2014 Sapporo; (Joint Collaborative Team On Video Coding of ISO/IEC JTC1/SC29/WG11 and ITU-T SG.16); URL: http://phenix.itsudparis.eu/jct/doc_end_user/current document.php?id=9471 No. JCTVC-R1005-v3, Aug. 9, 2014 Aug. 9, 2014), XP030116693, 360 pages.
Kim, I-K., et al., "Grouping of bypass bins for last position coding of transform coefficients", 7. JCT-VC Meeting; 98. MPEG Meeting; Nov. 21, 2011-Nov. 30, 2011; Geneva; (Joint Collaborative Team On Video Coding of ISO/IEC JTC1/SC29/WG11 and ITU-T SG.16); URL: HTTP://WFTP3.ITU.INT/AV-ARCH/JCTVC-SITE/No. JCTVC-3554, Nov. 8, 2011 (Nov. 8, 2011), XP030110538, the whole document.
Maani E., et al., "SAO Type Coding Simplification (JCTVC-10246 version 3)," 9. JCT-VC meeting; 100. MPEG meeting; Apr. 27, 2012-Jul. 5, 2012; Geneva; (Joint Collaborative Team on Video Coding of ISO/IEC JTC1/SC29/WG11 and ITU-T SG.16), Apr. 28, 2012 (Apr. 28, 2012), pp. 1-4, XP055077671.
Maani E., et al., "SAO Type Coding Simplification (JCTVC-I0246 version 3 -CD)", 9. JCT-VC meeting; 100. MPEG meeting; Apr. 27, 2012-Jul. 5, 2012; Geneva; (Joint Collaborative Team on Video Coding of ISO/IEC JTC1/SC29/WG11 and ITU-T SG.16 ), Apr. 28, 2012 (Apr. 28, 201), pp. 1-3, XP055077673.
Maani, et al., "SAO Type Coding Simplification," Document: JCTVC-10246, Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-4.
Sole J., et al., "AhG6: Bypass bins grouping in SAO", 10. JCT-VC Meeting; 101. MPEG Meeting; Nov. 7, 2012 -Jul. 20, 2012; Stockholm; (Joint Collaborative Team On Video Coding of ISO/IEC JTC1/SC29/WG11 and ITU-T SG.16); URL: HTTP://WFTP3.ITU.INT/AV-ARCH/JCTVC-SITE/ No. JCTVC-J0054, Jun. 26, 2012 (Jun. 26, 2012), XP030112416, the whole document.
Sole J., et al., "Non-CE6: Delta QP signalling for palette," JCTVC-S0043-r2, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, URL: http://phenix.itsudparis.eu/jct/doc_end_user/current_document.php?id=9489, 3 pages.
Sze V., et al., "High Throughput CABAC Entropy Coding in HEVC", IEEE Transactions On Circuits And Systems For Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.
Sze, V., et al., "Parallel Context Processing of Coefficient Level", 6. JCT-VC MEETING;97. MPEG Meeting Jul. 14, 2011-Jul. 22, 2011; Torino; (Joint Collaborative Team On Video Coding of ISO/IEC JTC1/SC29/WG11 and ITU-T SG.16 );URL: HTTP://WFTP3.ITU.INT/AV-ARCH/JCTVC-SITE/, No. JCTVC-F130, Jul. 22, 2011 (Jul. 22, 2011), XP030009153.
Taiwan Search Report—TW105118449—TIPO—dated Dec. 31, 2019.
Wiegand T., et al., "WD3: Working Draft 3 of High-Efficiency Video Coding", JCTVC-E603 d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 16 Pages.
Wiegand, T., et al., "WD2: Working Draft 2 of High-Efficiency Video Coding", 20110128, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.
Wiegand T., et al.,"WD1: Working Draft 1 of High-Efficiency Video Coding", JCTVC-C403, Joint Collaborative Team an Video Coding (JCT-VC), of ITU-T SG16 WP3 and ISO/IEC JTC1/SC29/WG11, 3rd Meeting: Guangzhou, CN, Oct. 7-15, 2010, 137 pp.

* cited by examiner

GROUPING PALETTE BYPASS BINS FOR VIDEO CODING

This application claims the benefit of U.S. Provisional Application No. 62/175,137 filed Jun. 12, 2015, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T-H.265, the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In one example, a method of decoding video data includes decoding, from a coded video bitstream, a syntax element that indicates whether a transpose process is applied to palette indices of a palette for a current block of video data; decoding, from the coded video bitstream and at a position in the coded video bitstream that is after the syntax element that indicates whether the transpose process is applied to palette indices of the palette for the current block of video data, one or more syntax elements related to delta quantization parameter (QP) and/or chroma QP offsets for the current block of video data; and decoding the current block of video data based on the palette for the current block of video data and the one or more syntax elements related to delta QP and/or chroma QP offsets for the current block of video data.

In another example, a method of encoding video data includes encoding, in a coded video bitstream, a syntax element that indicates whether a transpose process is applied to palette indices of a palette for a current block of video data; encoding, in the coded video bitstream and at a position in the coded video bitstream that is after the syntax element that indicates whether the transpose process is applied to palette indices of the palette for the current block of video data, one or more syntax elements related to delta QP and/or chroma QP offsets for the current block of video data; and encoding the current block of video data based on the palette for the current block of video data and the one or more syntax elements related to delta QP and/or chroma QP offsets for the current block of video data.

In another example, a device for coding video data includes a memory configured to store video data and one or more processors. In this example, the one or more processors are configured to: code, in a coded video bitstream, a syntax element that indicates whether a transpose process is applied to palette indices of a palette for a current block of video data; code, in the coded video bitstream and at a position in the coded video bitstream that is after the syntax element that indicates whether the transpose process is applied to palette indices of the palette for the current block of video data, one or more syntax elements related to delta QP and/or chroma QP offsets for the current block of video data; and code the current block of video data based on the palette for the current block of video data and the one or more syntax elements related to delta QP and/or chroma QP offsets for the current block of video data In another example, a device for coding video data includes means for coding, in a coded video bitstream, a syntax element that indicates whether a transpose process is applied to palette indices of a palette for a current block of video data; means for coding, in the coded video bitstream and at a position in the coded video bitstream that is after the syntax element that indicates whether the transpose process is applied to palette indices of the palette for the current block of video data, one or more syntax elements related to delta QP and/or chroma QP offsets for the current block of video data; and means for coding the current block of video data based on the palette for the current block of video data and the one or more syntax elements related to delta QP and/or chroma QP offsets for the current block of video data.

In another example, a computer-readable storage medium stores instructions that, when executed, cause one or more processors of a video coding device to: code, in a coded video bitstream, a syntax element that indicates whether a transpose process is applied to palette indices of a palette for a current block of video data; code, in the coded video bitstream and at a position in the coded video bitstream that is after the syntax element that indicates whether the transpose process is applied to palette indices of the palette for the current block of video data, one or more syntax elements related to delta QP and/or chroma QP offsets for the current block of video data; and code the current block of video data based on the palette for the current block of video data and the one or more syntax elements related to delta QP and/or chroma QP offsets for the current block of video data.

In another example, a computer-readable storage medium stores at least a portion of a coded video bitstream that, when processed by a video decoding device, cause one or more processors of the video decoding device to: determine whether a transpose process is applied to palette indices of a palette for a current block of video data; and decode the current block of the video data based on the palette for the current block of video data and a delta QP and one or more chroma QP offsets for the current block of video data, wherein one or more syntax elements related to the delta QP and one or more syntax elements related to the one or more chroma QP offsets for the current block of video data are located at a position in the coded video bitstream that is after a syntax element that indicates whether the transpose process is applied to palette indices of the palette for the current block of video data.

The details of one or more examples are set forth in the accompanying drawings and the description below. Other features, objects, and advantages will be apparent from the description and drawings, and from the claims.

DETAILED DESCRIPTION

Figure 1:
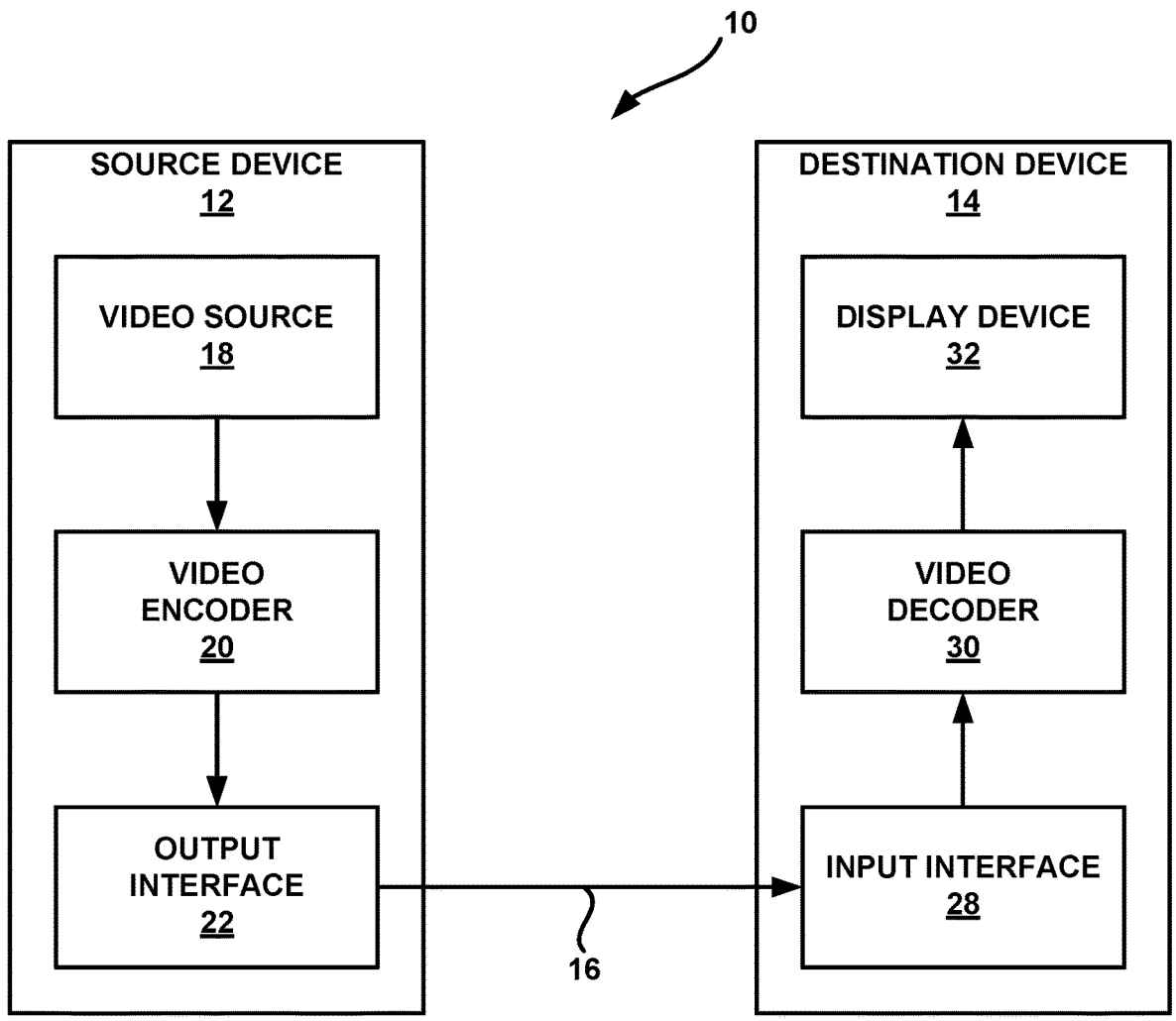
FIG. 1 is a block diagram illustrating an example video coding system that may utilize the techniques described in this disclosure.

This disclosure describes techniques for video coding and compression. In particular, this disclosure describes techniques for palette-based coding of video data. For instance, this disclosure describes techniques to support coding of video content, especially screen content with palette coding, such as techniques for improved palette index binarization, and techniques for signaling for palette coding.

In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines, and high contrast object boundaries. The assumption of continuous-tone and smoothness may no longer apply and thus traditional video coding techniques may not be efficient ways to compress.

Based on the characteristics of screen content video, palette coding is introduced to improve screen content coding (SCC) efficiency as proposed in Guo et al., "Palette Mode for Screen Content Coding," Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0323, available at http://phenix.it-sudparis.eu/jct/doc_end_user/documents/13_Incheon/wg11/JCTVC-M0323-v3.zip, (hereinafter "JCTVC-M0323"). Specifically, palette coding introduces a lookup table, i.e., a color palette, to compress repetitive pixel values based on the fact that in SCC, colors within one CU usually concentrate on a few peak values. Given a palette for a specific CU, pixels within the CU are mapped to palette indices. In the second stage, an effective copy from left run length method is proposed to effectively compress the index block's repetitive pattern. In some examples, the palette index coding mode may be generalized to both copy from left and copy from above with run length coding. Note that, in some examples, no transformation process may be invoked for palette coding to avoid blurring sharp edges which can have a huge negative impact on visual quality of screen contents.

As discussed above, this disclosure describes palette-based coding, which may be particularly suitable for screen generated content coding. For example, assume a particular area of video data has a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that maps the pixel value to the appropriate value in the palette.

In the example above, a video encoder may encode a block of video data by determining a palette for the block, locating an entry in the palette to represent the color value of each pixel, and encoding the palette with index values for the pixels mapping the pixel value to the palette. A video decoder may obtain, from an encoded bitstream, a palette for a block, as well as index values for the pixels of the block. The video decoder may map the index values of the pixels to entries of the palette to reconstruct the luma and chroma pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

For example, according to aspects of this disclosure, a video coder (video encoder or video decoder) may code one or more syntax elements for each block that is coded using a palette coding mode. For example, the video coder may code a palette_mode_flag to indicate whether a palette-based coding mode is to be used for coding a particular block. In this example, a video encoder may encode a palette_mode_flag with a value that is equal to one to specify that the block currently being encoded ("current block") is encoded using a palette mode. In this case, a video decoder may obtain the palette_mode_flag from the encoded bitstream and apply the palette-based coding mode to decode the block. In instances in which there is more than one palette-based coding mode available (e.g., there is more than one palette-based technique available for coding), one or more syntax elements may indicate one of a plurality of different palette modes for the block.

In some instances, the video encoder may encode a palette_mode_flag with a value that is equal to zero to specify that the current block is not encoded using a palette mode. In such instances, the video encoder may encode the block using any of a variety of inter-predictive, intra-predictive, or other coding modes. When the palette_mode_flag is equal to zero, the video encoder may encode additional information (e.g., syntax elements) to indicate the specific mode that is used for encoding the respective block. In some examples, as described below, the mode may be an HEVC coding mode. The use of the palette_mode_flag is described for purposes of example. In other examples, other syntax elements such as multi-bit codes may be used to indicate whether the palette-based coding mode is to be used for one or more blocks, or to indicate which of a plurality of modes are to be used.

When a palette-based coding mode is used, a palette may be transmitted by an encoder in the encoded video data bitstream for use by a decoder. A palette may be transmitted for each block or may be shared among a number of blocks in a picture or slice. The palette may refer to a number of pixel values that are dominant and/or representative for the block, including, e.g., a luma value and two chroma values.

In some examples, a syntax element, such as a transpose flag, may be coded to indicate whether a transpose process is applied to palette indices of a current palette. If transpose flag is zero, the palette indices for samples may be coded in a horizontal traverse scan. Similarly, if the transpose flag is one, the palette indices for samples may be coded in a vertical traverse scan. This can be thought of as decoding the index values assuming horizontal traverse scan and then transposing the block (rows to columns).

Aspects of this disclosure include techniques for coding the palette. For example, according to aspects of this disclosure, a video encoder may encode one or more syntax elements to define a palette. Some example syntax elements which a video encoder may encode to define a current palette for a current block of video data include, but are not limited to, a syntax element that indicates whether a transpose process is applied to palette indices of the current palette (e.g., palette_transpose_flag) (i.e., whether the, one or more syntax elements related to delta quantization parameter (QP) (e.g., cu_qp_delta_palette_abs, cu_qp_delta_palette_sign_flag, cu_chroma_qp_palette_offset_flag, and/or cu_chroma_qp_palette_offset_idx), one or more syntax elements related to chroma QP offsets for the current block of video data, one or more syntax elements that indicate a number of zeros that precede a non-zero entry in an array that indicates whether entries from a predictor palette are reused in the current palette (e.g., palette_predictor_run), one or more syntax elements that indicate a number of entries in the current palette that are explicitly signalled (e.g., num_signalled_palette_entries), one or more syntax elements that indicate a value of a component in a palette entry in the current palette (e.g., palette_entry), one or more syntax elements that indicate whether the current block of video data includes at least one escape coded sample (e.g., palette_escape_val_present_flag), one or more syntax elements that indicate a number of entries in the current palette that are explicitly signalled or inferred (e.g., num_palette_indices_idc), and one or more syntax elements that indicate indices in an array of current palette entries (e.g., palette_index_idc). For example, when operating in accordance with the HEVC Screen Content Coding (SCC) Draft 3 (Joshi et al., "High Efficiency Video Coding (HEVC) Screen Content Coding: Draft 3," Joint Collaborative Team on Video Coding (JCT-VC) of ITU-T SG 16 WP 3 and ISO/IEC JTC 1/SC 29/WG 11, 20th Meeting: Geneva, CH, 10 Feb.-17 Feb. 2015, Document: JCTVC-T1005, available at http://phenix.int-evey.fr/jct/doc_end_user/documents/20_Geneva/wg11/JCTVC-T1005-v2.zip, (hereinafter "HEVC SCC Draft 3"), a video coder may signal the syntax elements listed in palette_coding( ) syntax table (section 7.3.8.8 of HEVC SCC Draft 3), reproduced below as Table 1.

TABLE 1

| | Descriptor |
|---|---|
| palette_coding( x0, y0, nCbS ) { | |
|   palettePredictionFinished = 0 | |
|   NumPredictedPaletteEntries = 0 | |
|   for( i = 0; i < PredictorPaletteSize && !palettePredictionFinished && | |
|     NumPredictedPaletteEntries < palette_max_size; i++ ) { | |
|     palette_predictor_run | ue(v) |
|     if( palette_predictor_run != 1 ) { | |
|       if( palette_predictor_run > 1 ) | |
|         i += palette_predictor_run − 1 | |
|       PalettePredictorEntryReuseFlag[ i ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ue(v) |
|   numComps = (ChromaArrayType = = 0 ) ? 1 : 3 | |
|   for( cIdx = 0; cIdx < numComps; cIdx++ ) | |
|     for( i = 0; i < num_signalled_palette_entries; i++ ) | |
|       palette_entry | ae(v) |
|   if( CurrentPaletteSize != 0 ) | |
|     palette_escape_val_present_flag | ae(v) |
|       if( palette_escape_val_present_flag ) { | |
|         if( cu_qp_delta_enabled_flag && !IsCuQpDeltaCoded ) { | |
|           cu_qp_delta_palette_abs | ae(v) |

TABLE 1-continued

| | Descriptor |
|---|---|
|         if( cu_qp_delta_palette_abs ) | |
|            cu_qp_delta_palette_sign_flag | ae(v) |
|         } | |
|         if( cu_chroma_qp_offset_enabled_flag && !IsCuChromaQpOffsetCoded ) { | |
|            cu_chroma_qp_palette_offset_flag | ae(v) |
|            if( cu_chroma_qp_offset_flag && chroma_qp_offset_list_len_minus1 > 0 ) | |
|               cu_chroma_qp_palette_offset_idx | ae(v) |
|         } | |
|     } | |
|   if( MaxPaletteIndex > 0 ) { | |
|     palette_transpose_flag | ae(v) |
|     num_palette_indices_idc | ae(v) |
|     for( i=0; i < NumPaletteIndices; i++ ) { | |
|       palette_index_idc | ae(v) |
|       PaletteIndexIdc[ i ] = palette_index_idc | |
|     } | |
|     last_palette_run_type_flag | ae(v) |
|   } | |
|   CurrNumIndices = 0 | |
|   PaletteScanPos = 0 | |
|   while( PaletteScanPos < nCbS * nCbS) { | |
|     xC = x0 + travScan[ PaletteScanPos ][ 0 ] | |
|     yC = y0 + travScan[ PaletteScanPos ][ 1 ] | |
|     if( PaletteScanPos > 0) { | |
|       xcPrev = x0 + travScan[ PaletteScanPos − 1 ][ 0 ] | |
|       ycPrev = y0 + travScan[ PaletteScanPos − 1 ][ 1 ] | |
|     } | |
|     PaletteRun = nCbS * nCbS − PaletteScanPos − 1 | |
|     if( MaxPaletteIndex > 0 && CurrNumIndices < NumPaletteIndices ) { | |
|       if( PaletteScanPos >= nCbS && palette_run_type_flag[ xcPrev ][ ycPrev ] | |
|         != COPY_ABOVE_MODE && PaletteScanPos < nCbS * nCbS − 1 ) { | |
|         palette_run_type_flag[ xC ][ yC ] | ae(v) |
|       } | |
|       readIndex = 0 | |
|       if( palette_run_type_flag[ xC ][ yC ] = = COPY_INDEX_MODE && | |
|         AdjustedMaxPaletteIndex > 0) | |
|         readIndex = 1 | |
|       maxPaletteRun = nCbS* nCbS − PaletteScanPos − 1 | |
|       if( AdjustedMaxPaletteIndex > 0 && | |
|         ( ( CurrNumIndices + readIndex ) < NumPaletteIndices | | | |
|         palette_run_type_flag[ xC ][ yC ] != last_palette_run_type_flag ) ) | |
|         if( maxPaletteRun > 0 ) { | |
|           palette_run_msb_id_plus1 | ae(v) |
|           if( palette_run_msb_id_plus1 > 1 ) | |
|             palette_run_refinement_bits | ae(v) |
|         } | |
|       CurrNumIndices + = readIndex | |
|     } | |
|     runPos = 0 | |
|     while ( runPos < = paletteRun ) { | |
|       xR = x0 + travScan[ PaletteScanPos ][ 0 ] | |
|       yR = y0 + travScan[ PaletteScanPos ][ 1 ] | |
|       if(palette_run_type_flag[ xC ][ yC ] = = COPY_INDEX_MODE ) { | |
|         PaletteSampleMode[ xR ][ yR ] = COPY_INDEX_MODE | |
|         PaletteIndexMap[ xR ][ yR ] = CurrPaletteIndex | |
|       } else { | |
|         PaletteSampleMode[ xR ][ yR ] = COPY_ABOVE_MODE | |
|         PaletteIndexMap[ xR ][ yR ] = PaletteIndexMap[ xR ][ yR − 1 ] | |
|       } | |
|       runPos++ | |
|       PaletteScanPos++ | |
|     } | |
|   } | |
|   if( palette_escape_val_present_flag ) { | |
|     sPos = 0 | |
|     while( sPos < nCbS * nCbS ) { | |
|       xC = x0 + travScan[ sPos ][ 0 ] | |
|       yC = y0 + travScan[ sPos ][ 1 ] | |

TABLE 1-continued

| | Descriptor |
|---|---|
| `if( PaletteIndexMap[ xC ][ yC ] = = MaxPaletteIndex ) {`<br>  `for( cIdx = 0; cIdx < numComps; cIdx++ )`<br>    `if( cIdx = = 0 ||`<br>      `( xR % 2 = = 0 && yR % 2 = = 0 && ChromaArrayType = = 1 ) ||`<br>      `( xR % 2 = = 0 && ChromaArrayType = = 2 ) ||`<br>      `ChromaArrayType = = 3 ) {`<br>        `palette_escape_val`<br>        `PaletteEscapeVal[ cIdx ][ xC ][ yC ] = palette_escape_val`<br>      `}`<br>    `}`<br>  `}`<br>  `sPos++`<br>  `}`<br> `}`<br>`}` | <br><br><br><br><br><br>ae(v) |

In addition to providing an order in which the syntax elements are included in a bitstream, Table 1 also provides a descriptor for each of the syntax elements that indicates an encoding type for each syntax element. As one example, a video encoder may encode syntax elements with the ue(v) descriptor using unsigned integer 0-th order Exp-Golomb-codes with the left bit first. As another example, a video encoder may encode syntax elements with the ae(v) descriptor using context-adaptive arithmetic entropy-codes (CABAC). When bins of a syntax element are encoded use CABAC, a video encoder may encode one or more of the bins using a context and/or may encode one or more of the bins without a context. Encoding a bin using CABAC without a context may be referred to as bypass mode. HEVC SCC Draft 3 further provides a table (Table 9-47 of the HEVC SCC Draft 3), partially reproduced below as Table 2, that indicates which bins of the syntax elements listed in Table 1 are coded with contexts (i.e., as indicated by context "0" and context "1") and which bins are coded in bypass mode.

When encoding a bin using CABAC with a context, a video encoder may load the context from storage into memory. In some examples, a video encoder may have limited memory resources available and/or it may be time consuming to load a context into memory. As such, it may be desirable for a video encoder to minimize the amount of times contexts are loaded into memory. In some examples, grouping bypass bins together may reduce the amount of times contexts are loaded into memory, which may increase CABAC throughput.

In Ye et al., "CE1-related: Palette Mode Context and Codeword Simplification," Joint Collaborative Team on Video Coding (JCT-VC) of ITU-T SG 16 WP 3 and ISO/IEC JTC 1/SC 29/WG 11, 21st Meeting: Warsaw, P L, 19-26 Jun. 2015, Document: JCTVC-U0090, available at http://phenix.it-sudparis.eu/jct/doc_end_user/documents/21_Warsaw/wg11/JCTVC-U0090-v1.zip (hereinafter, "JCTVC-U0090"), it was proposed that the palette_transpose_flag be signalled after the last_palette_run_type_flag. Specifically, JCTVC-U0090 proposes modifying the palette coding( ) syntax table as shown below in Table 3 (where text in italics is inserted and text in [[double bracket italics]] is deleted).

TABLE 2

| | binIdx | | | | | |
|---|---|---|---|---|---|---|
| Syntax element | 0 | 1 | 2 | 3 | 4 | >= 5 |
| palette_predictor_run | bypass | bypass | bypass | bypass | bypass | bypass |
| num_signalled_palette_entries | bypass | bypass | bypass | bypass | bypass | bypass |
| palette_entry | bypass | bypass | bypass | bypass | bypass | bypass |
| palette_escape_val_present_flag | bypass | na | na | na | na | na |
| cu_qp_delta_palette_abs | 0 | 1 | 1 | 1 | 1 | bypass |
| cu_qp_delta_palette_sign_flag | bypass | na | na | na | na | na |
| cu_chroma_qp_palette_offset_flag | 0 | na | na | na | na | na |
| cu_chroma_qp_palette_offset_idx | 0 | 0 | 0 | 0 | 0 | na |
| palette_transpose_flag | 0 | na | na | na | na | na |
| num_palette_indices_idc | bypass | bypass | bypass | bypass | bypass | bypass |
| last_palette_run_type_flag | 0 | na | na | na | na | na |
| palette_run_type_flag | 0 | na | Na | na | na | na |
| palette_index_idc | bypass | bypass | bypass | bypass | bypass | bypass |
| palette_run_msb_id_plus1 | | | (clause 9.3.4.2.8) | | | |
| palette_run_refinement_bits | bypass | bypass | bypass | bypass | bypass | bypass |
| palette_escape_val | bypass | bypass | bypass | bypass | bypass | bypass |

A comparison of Table 1 and Table 2 shows that HEVC SCC Draft 3 prescribes that all the syntax elements before cu_qp_delta_palette_abs (i.e., num_signalled_palette_entries, palette_entry, and palette_escape_val_present_flag) are bypass-coded. Similarly, syntax elements after palette_transpose_flag and before last_palette_run_type_flag (i.e., num_palette_indices_idc and palette_index_idc) are also bypass coded.

TABLE 3

| `if( MaxPaletteIndex > 0 ) {` | |
|---|---|
|   `[[palette_transpose_flag]]` | `[[ae(v)]]` |
|   `num_palette_indices_idc` | `ae(v)` |

TABLE 3-continued

```
for( i=0; i < NumPaletteIndices; i++ ) {
    palette_index_idc                                    ae(v)
    PaletteIndexIdc[ i ] = palette_index_idc
}
last_palette_run_type_flag                               ae(v)
palette_transpose_flag                                   ae(v)
}
```

However, in some examples, the arrangement of syntax elements proposed by JCTVC-U0090 may not be optimal. For instance, when syntax elements related to delta QP (i.e., cu_qp_delta_palette_abs and cu_qp_delta_palette_sign_flag) and chroma QP offset (i.e., cu_chroma_qp_palette_offset_flag and cu_chroma_qp_palette_offset_idx) are present, the arrangement of syntax elements proposed by JCTVC-U0090 may not result in grouping of any additional bypass bins.

In accordance with one or more techniques of this disclosure, a video encoder may encode the syntax elements used to define a current palette such that syntax elements that are encoded using bypass mode are consecutively encoded. For instance, as opposed to encoding one or more syntax elements related to delta quantization parameter (QP) and/or chroma QP offsets for a current block of video data before a syntax element that indicates whether a transpose process is applied to palette indices of a palette for the current block of video data, a video encoder may encode the one or more syntax elements related to delta QP and/or chroma QP offsets for the current block of video data after the syntax element that indicates whether a transpose process is applied to the palette indices of the palette for the current block of video data.

One example of how the palette coding( ) syntax table may be modified to move the signalling of the syntax elements related to delta QP and chroma QP offsets after the palette_transpose_flag is shown below in Table 4 (where text in italics is inserted and text in [[double bracket italics]] is deleted relative to a previous version of Table 4 in HEVC SCC Draft 3).

TABLE 4

| | Descriptor |
|---|---|
| palette_coding( x0, y0, nCbS ) { | |
|   palettePredictionFinished = 0 | |
|   NumPredictedPaletteEntries = 0 | |
|   for( i = 0; i < PredictorPaletteSize && !palettePredictionFinished && | |
|     NumPredictedPaletteEntries < palette_max_size; i++ ) { | |
|     palette_predictor_run | ue(v) |
|     if( palette_predictor_run != 1 ) { | |
|       if( palette_predictor_run > 1 ) | |
|         i += palette_predictor_run − 1 | |
|       PalettePredictorEntryReuseFlag[ i ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ue(v) |
|   numComps = ( ChromaArrayType = = 0 ) ? 1 : 3 | |
|   for( cIdx = 0; cIdx < numComps; cIdx++ ) | |
|     for( i = 0; i < num_signalled_palette_entries; i++ ) | |
|       palette_entry | ae(v) |
|   if( CurrentPaletteSize != 0 ) | |
|     palette_escape_val_present_flag | ae(v) |
|   [[if( palette_escape_val_present_flag ) {]] | |
|     [[if( cu_qp_delta_enabled_flag && !IsCuQpDeltaCoded ) {]] | |
|       [[cu_qp_delta_palette_abs]] | [[ae(v)]] |
|       [[if( cu_qp_delta_palette_abs )]] | |
|         [[cu_qp_delta_palette_sign_flag]] | [[ae(v)]] |
|     [[}]] | |
|     [[if( cu_chroma_qp_offset_enabled_flag && !IsCuChromaQpOffsetCoded ) {]] | |
|       [[cu_chroma_qp_palette_offset_flag]] | [[ae(v)]] |
|       [[if( cu_chroma_qp_offset_flag && chroma_qp_offset_list_len_minus1 > 0 )]] | |
|         [[cu_chroma_qp_palette_offset_idx]] | [[ae(v)]] |
|     [[}]] | |
|   [[}]] | |
|   if( MaxPaletteIndex > 0) { | |
|     [[palette_transpose_flag]] | [[ae(v)]] |
|     num_palette_indices_idc | ae(v) |
|     for( i=0; i < NumPaletteIndices; i++ ) { | |
|       palette_index_idc | ae(v) |
|       PaletteIndexIdc[ i ] = palette_index_idc | |
|     } | |
|     last_palette_run_type_flag | ae(v) |
|     *palette_transpose_flag* | ae(v) |
|   } | |
|   *if( palette_escape_val_present_flag ) {* | |
|     *if( cu_qp_delta_enabled_flag && !IsCuQpDeltaCoded ) {* | |
|       *cu_qp_delta_palette_abs* | ae(v) |
|       *if( cu_qp_delta_palette_abs )* | |
|         *cu_qp_delta_palette_sign_flag* | ae(v) |
|     *}* | |

TABLE 4-continued

|  | Descriptor |
|---|---|
|     *if( cu_chroma_qp_offset_enabled_flag && !IsCuChromaQpOffsetCoded ) {* |  |
|         *cu_chroma_qp_palette_offset_flag* | ae(v) |
|         *if( cu_chroma_qp_offset_flag && chroma_qp_offset_list_len_minus1 > 0 )* |  |
|             *cu_chroma_qp_palette_offset_idx* | ae(v) |
|     } |  |
| } |  |
| CurrNumIndices = 0 |  |
| PaletteScanPos = 0 |  |
| ... |  |

By moving the one or more syntax elements related to delta QP and/or chroma QP offsets for the current block of video data after the syntax element that indicates whether a transpose process is applied to the palette indices of the palette for the current block of video data, the video encoder may group together (i.e., consecutively encode) a larger number of syntax elements that are coded using bypass mode. For example, by moving the one or more syntax elements related to delta QP and/or chroma QP offsets for the current block of video data after the syntax element that indicates whether a transpose process is applied to the palette indices of the palette for the current block of video data, the video encoder may group together one or more syntax elements that indicate a number of entries in the current palette that are explicitly signalled or inferred (e.g., num_palette_indices_idc) and one or more syntax elements that entriesindices in an array of current palette entries (e.g., palette_index_idc) with one or more syntax elements related to chroma QP offsets for the current block of video data, one or more syntax elements that indicate a number of zeros that precede a non-zero entry in an array that indicates whether entries from a predictor palette are reused in the current palette (e.g., palette_predictor_run), one or more syntax elements that indicate a number of entries in the current palette that are explicitly signalled (e.g., num_signalled_palette_entries), one or more syntax elements that indicate a value of a component in a palette entry in the current palette (e.g., palette_entry), and one or more syntax elements that indicate whether the current block of video data includes at least one escape coded sample (e.g., palette_escape_val_present_flag). In this way, the techniques of this disclosure may increase CABAC throughput, which may reduce the time needed to encode video data using palette mode encoding. For instance, by grouping together the bypass coded syntax elements, a video coder may sequentially encode the grouped syntax elements using without starting, stopping, restarting, reloading, and resetting a CABAC coding engine Table 4 is only one example of how the syntax elements may be arranged. In some examples, the syntax elements related to delta QP and chroma QP offset may be moved further down the syntax table. For example, the syntax elements related to delta QP and chroma QP offset could be placed just before the component values for escape samples (i.e., palette_escape_val). One example of how the syntax elements related to delta QP and chroma QP offset could be placed just before the component values for escape samples is shown below in Table 5 (where text in italics is inserted and text in [[double bracket italics]] is deleted relative to HEVC SCC Draft 3).

TABLE 5

|  | Descriptor |
|---|---|
| palette_coding( x0, y0, nCbS ) { |  |
|   palettePredictionFinished = 0 |  |
|   NumPredictedPaletteEntries = 0 |  |
|   for( i = 0; i < PredictorPaletteSize && !palettePredictionFinished && |  |
|       NumPredictedPaletteEntries < palette_max_size; i++ ) { |  |
|     palette_predictor_run | ue(v) |
|     if( palette_predictor_run != 1 ) { |  |
|       if( palette_predictor_run > 1 ) |  |
|         i += palette_predictor_run − 1 |  |
|       PalettePredictorEntryReuseFlag[ i ] = 1 |  |
|       NumPredictedPaletteEntries++ |  |
|     } else |  |
|       palettePredictionFinished = 1 |  |
|   } |  |
|   if( NumPredictedPaletteEntries < palette_max_size ) |  |
|     num_signalled_palette_entries | ue(v) |
|   numComps = ( ChromaArrayType = = 0 ) ? 1 : 3 |  |
|   for( cIdx = 0; cIdx < numComps; cIdx++ ) |  |
|     for( i = 0; i < num_signalled_palette_entries; i++ ) |  |
|       palette_entry | ae(v) |
|   if( CurrentPaletteSize != 0 ) |  |
|     palette_escape_val_present_flag | ae(v) |
|   [[*if( palette_escape_val_present_flag ) {*]] |  |
|     [[*if( cu_qp_delta_enabled_flag && !IsCuQpDeltaCoded ) {*]] |  |
|       [[*cu_qp_delta_palette_abs*]] | [[ae(v)]] |
|       [[*if( cu_qp_delta_palette_abs )*]] |  |
|         [[*cu_qp_delta_palette_sign_flag*]] | [[ae(v)]] |
|     [[}]] |  |
|     [[*if( cu_chroma_qp_offset_enabled_flag && !IsCuChromaQpOffsetCoded ) {*]] |  |
|       [[*cu_chroma_qp_palette_offset_flag*]] | [[ae(v)]] |

TABLE 5-continued

|  | Descriptor |
|---|---|
| [[if( cu_chroma_qp_offset_flag && chroma_qp_offset_list_len_minus1 > 0 )]]<br>    [[cu_chroma_qp_palette_offset_idx]]<br>  [[}]]<br>[[}]]<br>if( MaxPaletteIndex > 0 ) {<br>  ~~[[palette_transpose_flag]]~~<br>  num_palette_indices_idc<br>  for( i=0; i < NumPaletteIndices; i++ ) {<br>    palette_index_idc<br>    PaletteIndexIdc[ i ] = palette_index_idc<br>  }<br>  last_palette_run_type_flag<br>  *palette_transpose_flag*<br>}<br>CurrNumIndices = 0<br>PaletteScanPos = 0<br>while( PaletteScanPos < nCbS * nCbS ) {<br>  xC = x0 + travScan[ PaletteScanPos ][ 0 ]<br>  yC = y0 + travScan[ PaletteScanPos ][ 1 ]<br>  if( PaletteScanPos > 0) {<br>    xcPrev = x0 + travScan[ PaletteScanPos − 1 ][ 0 ]<br>    ycPrev = y0 + travScan[ PaletteScanPos − 1 ][ 1 ]<br>  }<br>  PaletteRun = nCbS * nCbS − PaletteScanPos − 1<br>  if( MaxPaletteIndex > 0 && CurrNumIndices < NumPaletteIndices ) {<br>    if( PaletteScanPos >= nCbS && palette_run_type_flag[ xcPrev ][ ycPrev ]<br>      != COPY_ABOVE_MODE && PaletteScanPos < nCbS * nCbS − 1) {<br>      palette_run_type_flag[ xC ][ yC ]<br>    }<br>    readIndex = 0<br>    if( palette_run_type_flag[ xC ][ yC ] = = COPY_INDEX_MODE &&<br>      AdjustedMaxPaletteIndex > 0)<br>      readIndex = 1<br>    maxPaletteRun = nCbS * nCbS − PaletteScanPos − 1<br>    if( AdjustedMaxPaletteIndex > 0 &&<br>      ( ( CurrNumIndices + readIndex ) < NumPaletteIndices | |<br>      palette_run_type_flag[ xC ][ yC ] != last_palette_run_type_flag ) )<br>    if( maxPaletteRun > 0) {<br>      palette_run_msb_id_plus1<br>      if( palette_run_msb_id_plus1 > 1 )<br>        palette_run_refinement_bits<br>    }<br>    CurrNumIndices + = readIndex<br>  }<br>  runPos = 0<br>  while ( runPos < = paletteRun ) {<br>    xR = x0 + travScan[ PaletteScanPos ][ 0 ]<br>    yR = y0 + travScan[ PaletteScanPos ][ 1 ]<br>    if(palette_run_type_flag[ xC ][ yC ] = = COPY_INDEX_MODE ) {<br>      PaletteSampleMode[ xR ][ yR ] = COPY_INDEX_MODE<br>      PaletteIndexMap[ xR ][ yR ] = CurrPaletteIndex<br>    } else {<br>      PaletteSampleMode[ xR ][ yR ] = COPY_ABOVE_MODE<br>      PaletteIndexMap[ xR ][ yR ] = PaletteIndexMap[ xR ][ yR − 1 ]<br>    }<br>    runPos++<br>    PaletteScanPos++<br>  }<br>}<br>if( palette_escape_val_present_flag ) {<br>  if( cu_qp_delta_enabled_flag && !IsCuQpDeltaCoded ) {<br>    *cu_qp_delta_palette_abs*<br>    if( *cu_qp_delta_palette_abs* )<br>      *cu_qp_delta_palette_sign_flag*<br>  }<br>  if( *cu_chroma_qp_offset_enabled_flag && !IsCuChromaQpOffsetCoded* ) {<br>    *cu_chroma_qp_palette_offset_flag*<br>    if( *cu_chroma_qp_offset_flag && chroma_qp_offset_list_len_minus1 > 0* )<br>      *cu_chroma_qp_palette_offset_idx*<br>  }<br>  sPos = 0<br>  while( sPos < nCbS * nCbS ) {<br>    xC = x0 + travScan[ sPos ][ 0 ]<br>    yC = y0 + travScan[ sPos ][ 1 ] | [[ae(v)]]<br><br><br><br><br>~~[[ae(v)]]~~<br>ae(v)<br><br>ae(v)<br><br><br>ae(v)<br>ae(v)<br><br><br><br><br><br><br><br><br><br><br><br>ae(v)<br><br><br><br><br><br><br><br><br>ae(v)<br><br>ae(v)<br><br><br><br><br><br><br><br><br><br><br><br><br><br><br><br><br><br>ae(v)<br><br>ae(v)<br><br><br>ae(v)<br><br>ae(v) |

TABLE 5-continued

| | Descriptor |
|---|---|
| ```
        if( PaletteIndexMap[ xC ][ yC ] = = MaxPaletteIndex ) {
          for( cIdx = 0; cIdx < numComps; cIdx++ )
            if( cIdx = = 0 | |
              ( xR % 2 = = 0 && yR % 2 = = 0 && ChromaArrayType = = 1 ) | |
              ( xR % 2 = = 0 && ChromaArrayType = = 2 ) | |
              ChromaArrayType = = 3 ) {
                palette_escape_val
                PaletteEscapeVal[ cIdx ][ xC ][ yC ] = palette_escape_val
            }
        }
      }
      sPos++
    }
  }
}
``` | ae(v) |

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. Some example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). A copy of the finalized HEVC standard (i.e., ITU-T H.265, Series H: AUDIOVISUAL AND MULTIMEDIA SYSTEMS Infrastructure of audiovisual services—Coding of moving video, April, 2015) is available at https://www.itu.int/rec/T-REC-H.265-201504-I/en, (hereinafter the "HEVC Standard".

A Range Extension to HEVC, namely HEVC Screen Content Coding (SCC), is also being developed by the JCT-VC. A recent draft of HEVC SCC (Joshi et al., "High Efficiency Video Coding (HEVC) Screen Content Coding: Draft 4," Joint Collaborative Team on Video Coding (JCT-VC) of ITU-T SG 16 WP 3 and ISO/IEC JTC 1/SC 29/WG 11, 21st Meeting: Warsaw, P L, 19 Jun.-16 Jun. 2015, is available from http://phenix.it-sudparis.eu/jct/doc_end_user/documents/21_Warsaw/wg11/JCTVC-U1005-v2.zip, (hereinafter "HEVC SCC Draft 4").

With respect to the HEVC framework, as an example, the palette-based coding techniques may be configured to be used as a coding unit (CU) mode. In other examples, the palette-based coding techniques may be configured to be used as a prediction unit (PU) mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks, or even regions of non-rectangular shape.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by the HEVC Standard.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory. Source device 12 and destination device 14 may comprise any of a wide range of devices, including desktop computers, notebook (i.e., laptop) computers, tablet computers, set-top boxes, appliances, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 19. Similarly, encoded data may be accessed from storage device 19 by input interface. Storage device 19 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 19 may correspond to a file server or another intermediate storage device that may hold the encoded video generated by source device 12. Destination device 14 may access stored video data from storage device 19 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 19 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 19 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 19, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized HEVC standard (and various extensions thereof presently under development). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include VP8, and VP9.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more integrated circuits including microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware such as integrated circuitry using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a LCU. The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks.

In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of color values for representing the video data of the particular area (e.g., a given block). Each pixel may be associated with an entry in the palette that represents the color of the pixel, e.g., with a luma (Y) value and chroma (Cb and Cr) values. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

Aspects of this disclosure are directed to palette derivation, which may occur at the encoder and at the decoder. As one example, video encoder 20 may derive a palette for a current block by deriving a histogram of the pixels in the current block. In some examples, the histogram may be expressed as $H=\{(v_i,f_i), i=\{0, 1, 2, \ldots, M\}\}$ where $M+1$ is the number of different pixel values in the current block, $v_i$ is pixel value, and $f_i$ is the number of occurrence of $v_i$ (i.e., how many pixels in the current block have pixel value $v_i$). In such examples, the histogram generally represents a number of times that a pixel value occurs in the current block.

Video encoder 20 may initialize one or more variables when deriving the histogram. As one example, video encoder 20 may initialize a palette index idx to 0, (i.e., set idx=0). As another example, video encoder 20 may initialize the palette P to be empty (i.e., P=∅, set j=0.).

Video encoder 20 may sort the histogram, e.g., in descending order, such that pixels having more occurrences are placed near the front of a list of values. For instance, video encoder 20 may sort H according to the descending order of $f_i$ and the ordered list may be expressed as $H_o=\{(u_i, f_i), i=\{0, 1, 2, \ldots, M\}, f_i \geq f_{i+1}\}$. In this example, the ordered list includes the most frequently occurring pixel values at the front (top) of the list and the least frequently occurring pixel values at the back (bottom) of the list.

Video encoder 20 may copy one or more entries from the histogram into the palette. As one example, video encoder 20 may insert the entry in the histogram with the greatest frequency into the palette. For instance, video encoder 20 may insert (j, $u_j$) into the palette P (i.e., $P=P \cup \{(idx,u_j)\}$). In some examples, after inserting the entry into the palette, video encoder 20 may evaluate the entry in the histogram with the next greatest frequency for insertion into the palette. For instance, video encoder 20 may set idx=idx+1, j=j+1.

Video encoder 20 may determine whether the entry with the next greatest frequency (i.e., $u_{j+1}$) is within the neighborhood of any pixel (i.e., x) in the palette (i.e., Distance $(u_{j+1},x)$<Thresh). For instance, video encoder 20 may determine whether the entry is within the neighborhood of any pixel in the palette by determining whether a value of the entry is within a threshold distance of a value of any pixel in the palette. In some examples, video encoder 20 may flexibly select the distance function. As one example, video encoder 20 may select the distance function as a sum of absolute differences (SAD) or a sum of squared errors of prediction (SSE) of the three color components (e.g., each of luminance, blue hue chrominance, and red hue chrominance), or one color component (e.g., one of luminance, blue hue chrominance, or red hue chrominance). In some examples, video encoder 20 may flexibly select the threshold value Thresh. As one example, video encoder 20 may select the threshold value to be dependent on the quantization parameter (QP) of the current block. As another example, video encoder 20 may select the threshold value to be dependent on the value of idx or the value of j.

If video encoder 20 determines that the entry with the next greatest frequency (i.e., $u_{j+1}$) is within the neighborhood of any pixel in the palette, video encoder 20 may not insert the entry in the histogram. If video encoder 20 determines that the entry with the next greatest frequency (i.e., $u_{j+1}$) is not within the neighborhood of any pixel in the palette, video encoder 20 may insert the entry in the histogram.

Video encoder 20 may continue to insert entries in the palette until one or more conditions are satisfied. Some example conditions are when idx=M, when j=M, or when the size of the palette is larger than a predefined value.

Palette-based coding may have a certain amount of signaling overhead. For example, a number of bits may be needed to signal characteristics of a palette, such as a size of the palette, as well as the palette itself. In addition, a number of bits may be needed to signal index values for the pixels of the block. The techniques of this disclosure may, in some examples, reduce the number of bits needed to signal such information. For example, the techniques described in this disclosure may include techniques for various combinations of one or more of signaling palette-based coding modes, transmitting palettes, predicting palettes, deriving palettes, and transmitting palette-based coding maps and other syntax elements.

In some examples, video encoder 20 and/or video decoder 30 may predict a palette using another palette. For example, video encoder 20 and/or video decoder 30 may determine a first palette having first entries indicating first pixel values. Video encoder 20 and/or video decoder 30 may then determine, based on the first entries of the first palette, one or more second entries indicating second pixel values of a second palette. Video encoder 20 and/or video decoder 30 may also code pixels of a block of video data using the second palette.

When determining the entries of the second palette based on the entries in the first palette, video encoder 20 may encode a variety of syntax elements, which may be used by video decoder to reconstruct the second palette. For example, video encoder 20 may encode one or more syntax elements in a bitstream to indicate that an entire palette (or palettes, in the case of each color component, e.g., Y, Cb, Cr, or Y, U, V, or R, G, B, of the video data having a separate palette) is copied from one or more neighboring blocks of the block currently being coded. The palette from which entries of the current palette of the current block are predicted (e.g., copied) may be referred to as a predictive palette. The predictive palette may contain palette entries from one or more neighboring blocks including spatially neighboring blocks and/or neighboring blocks in a particular scan order of the blocks. For example, the neighboring blocks may be spatially located to the left (left neighboring block) of or above (upper neighboring block) the block currently being coded. In another example, video encoder 20 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Video encoder 20 may encode one or more syntax elements to indicate the location of the neighboring blocks from which the palette(s) are copied.

In some examples, palette prediction may be performed entry-wise. For example, video encoder 20 may encode one or more syntax elements to indicate, for each entry of a predictive palette, whether the palette entry is included in the palette for the current block. If video encoder 20 does not predict an entry of the palette for the current block, video encoder 20 may encode one or more additional syntax elements to specify the non-predicted entries, as well as the number of such entries.

The syntax elements described above may be referred to as a palette prediction vector. For example, as noted above, video encoder 20 and video decoder 30 may predict a palette for a current block based on one or more palettes from neighboring blocks (referred to collectively as a reference palette). When generating the reference palette, a first-in first-out (FIFO) may be used by adding the latest palette into the front of the queue. If the queue exceeds a predefined threshold, the oldest elements may be popped out. After pushing new elements into the front of the queue, a pruning process may be applied to remove duplicated elements, counting from the beginning of the queue. Specifically, in some examples, video encoder 20 may encode (and video decoder 30 may decode) a 0-1 vector to indicate whether the pixel values in the reference palette are reused for the current palette. As an example, as shown in the example of Table 6, a reference palette may include six items (e.g., six index values and respective pixel values).

TABLE 6

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

In an example for purposes of illustration, video encoder 20 may signal a vector (1, 0, 1, 1, 1, 1) that indicates that $v_0$, $v_2$, $v_3$, $v_4$, and $v_5$ are reused in the current palette, while $v_1$ is not re-used. In addition to reusing $v_0$, $v_2$, $v_3$, $v_4$, and $v_5$, video encoder 20 may add two new items to the current palette with indexes 5 and 6. The current palette for this example is shown in Table 7, below.

TABLE 7

| Pred Flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

To code the palette prediction 0-1 vector, for each item in the vector, video encoder 20 may code one bit to represent its value. Additionally, the number of palette items which cannot be predicted (e.g., the number of new palette entries (u0 and u1 in the example of Table 7 above)) may be binarized and signaled.

Other aspects of this disclosure relate to constructing and/or transmitting a map that allows video encoder 20 and/or video decoder 30 to determine pixel values. For example, other aspects of this disclosure relate to constructing and/or transmitting a map of indices that relate a particular pixel to an entry of a palette.

In some examples, video encoder 20 may indicate whether pixels of a block have a corresponding value in a palette. In an example for purposes of illustration, assume that an (i, j) entry of a map corresponds to an (i, j) pixel position in a block of video data. In this example, video encoder 20 may encode a flag for each pixel position of a block. Video encoder 20 may set the flag equal to one for the (i, j) entry to indicate that the pixel value at the (i, j) location is one of the values in the palette. When a color is included in the palette (i.e., the flag is equal to one), video encoder 20 may also encode data indicating a palette index for the (i, j) entry that identifies the color in the palette. When the color of the pixel is not included in the palette (i.e., the flag is equal to zero) video encoder 20 may also encode data indicating a sample value for the pixel, which may be referred to as an escape pixel. Video decoder 30 may obtain the above-described data from an encoded bitstream and use the data to determine a palette index and/or pixel value for a particular location in a block.

In some instances, there may be a correlation between the palette index to which a pixel at a given position is mapped and the probability of a neighboring pixel being mapped to the same palette index. That is, when a pixel is mapped to a particular palette index, the probability may be relatively high that one or more neighboring pixels (in terms of spatial location) are mapped to the same palette index.

In some examples, video encoder 20 and/or video decoder 30 may determine and code one or more indices of a block of video data relative to one or more indices of the same block of video data. For example, video encoder 20 and/or video decoder 30 may be configured to determine a first index value associated with a first pixel in a block of video data, where the first index value relates a value of the first pixel to an entry of a palette. Video encoder 20 and/or video decoder 30 may also be configured to determine, based on the first index value, one or more second index values associated with one or more second pixels in the block of video data, and to code the first and the one or more second pixels of the block of video data. Thus, in this example, indices of a map may be coded relative to one or more other indices of the map.

As discussed above, video encoder 20 and/or video decoder 30 may use several different techniques to code index values of a map relative to other indices of the map. For instance, video encoder 20 and/or video decoder 30 may use index mode, copy above mode, and transition mode to code index values of a map relative to other indices of the map.

In the "index mode" of pallet-based coding, video encoder 20 and/or video decoder 30 may first signal a palette index. If the index is equal to the size of the palette, this indicates that the sample is an escape sample. In this case, video encoder 20 and/or video decoder 30 may signal the sample value or quantized samples value for each component. For example, if the palette size is 4, for non-escape samples, the palette indices are in the range [0, 3]. In this case, an index value of 4 may signify an escape sample. If the index indicates a non-escape sample, video encoder 20 and/or video decoder 30 may signal a run-length, which may specify the number of subsequent samples in scanning order that share the same index, by a non-negative value n−1 indicating the run length, which means that the following n pixels including the current one have the same pixel index as the first signaled index.

In the "copy from above" mode of palette-based coding, video encoder 20 and/or video decoder 30 may signal a non-negative run length value m−1 to indicate that for the following m pixels including the current pixel, palette indexes are the same as their neighbors directly above, respectively. Note that the copy from above" mode is different from the "index" mode, in the sense that the palette indices could be different within the "copy from above" run mode.

As discussed above, in some examples, it may be desirable to group bypass bins together (i.e., to increase CABAC throughput). In accordance with one or more techniques of this disclosure, video encoder 20 may encode, and video decoder 30 may decode, syntax elements used to define a current palette such that syntax elements that are coded using bypass mode are grouped together. For instance, as opposed to coding one or more syntax elements related to delta quantization parameter (QP) and/or chroma QP offsets for a current block of video data before a syntax element that indicates whether a transpose process is applied to palette indices of a palette for the current block of video data, video encoder 20 and/or video decoder 30 may code the one or more syntax elements related to delta QP and/or chroma QP offsets for the current block of video data after the syntax element that indicates whether a transpose process is applied to the palette indices of the palette for the current block of video data. In this way, video encoder 20 and/or video decoder 30 may code a larger group of syntax elements using bypass mode, which may increase CABAC throughput.

In some examples, the one or more syntax elements related to delta QP for the current block of video data may include a syntax elements that specifies the absolute value of a difference between a luma QP for the current block of video data and a predictor of the luma QP for the current block (e.g., cu_qp_delta_palette_abs), and a syntax element that specifies a sign of the difference between the luma QP for the current block of video data and the predictor of the luma QP for the current block (e.g., cu_qp_delta_palette_sign_flag). In some examples, the one or more syntax elements related to chroma QP offsets for the current block of video data may include a syntax element that indicates whether entries in one or more offset lists are added to the luma QP for the current block to determine chroma QPs for the current block (e.g., cu_chroma_qp_palette_offset_flag), and a syntax element that specifies an index of an entry in each of the one or more offset lists that are added to the luma QP for the current block to determine chroma QPs for the current block (e.g., cu_chroma_qp_palette_offset_idx). As such, video encoder 20 and/or video decoder 30 may each be configured to code a palette_transpose_flag syntax element at a first position in a bitstream and code a cu_qp_delta_palette_abs syntax element, a cu_qp_delta_palette_sign_flag syntax element, a cu_chroma_qp_palette_offset_flag syntax element, and a cu_chroma_qp_palette_offset_idx syntax element at a second position in the bitstream that is after the first position.

Figure 2:
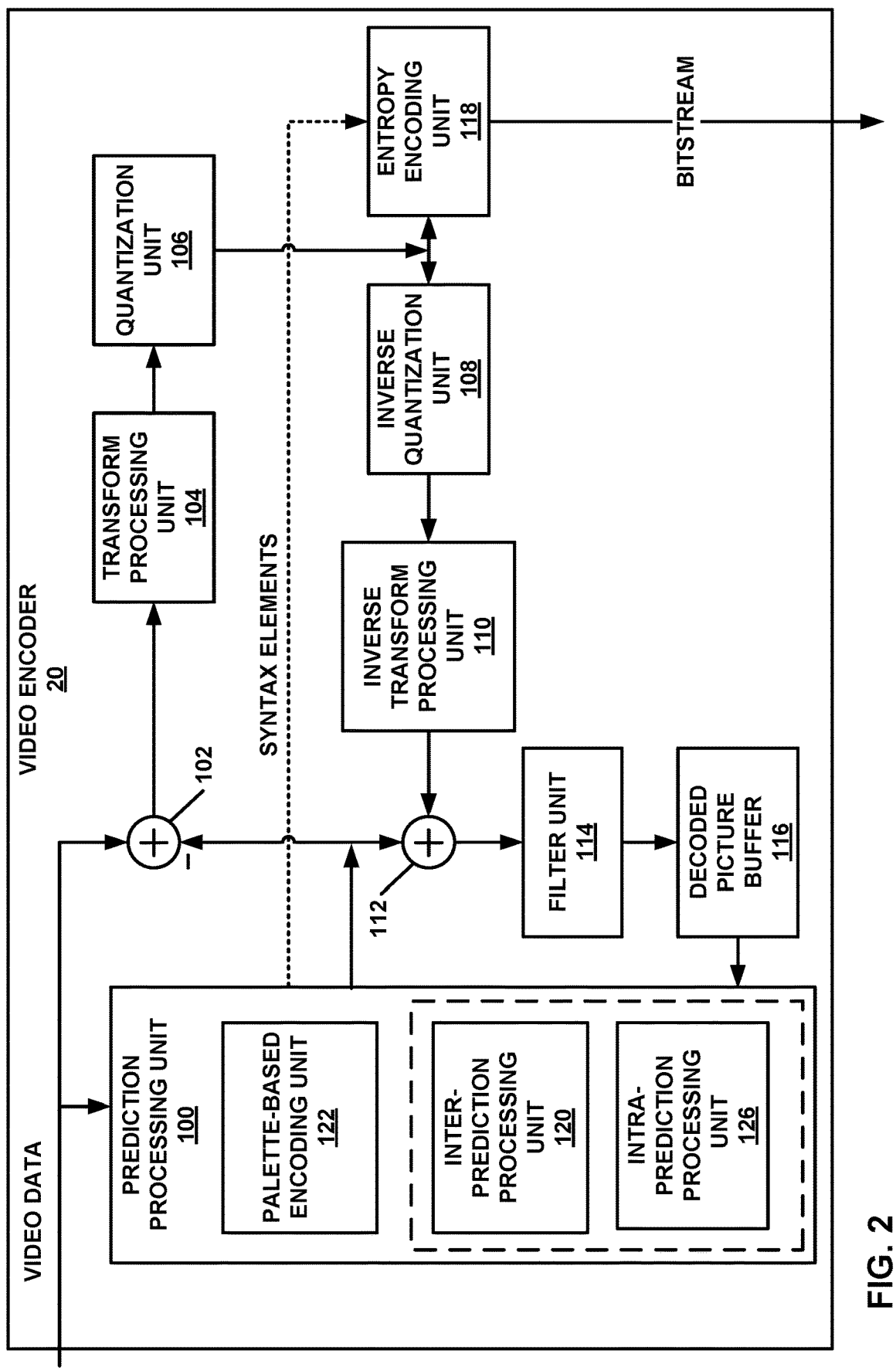
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by the HEVC Standard. Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks, or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may generate syntax elements to define a palette for a block of video data. Some example syntax elements which palette-based encoding unit 122 may generate to define a current palette for a current block of video data include, but are not limited to, a syntax element that indicates whether a transpose process is applied to palette indices of the current palette (e.g., palette_transpose_flag), one or more syntax elements related to delta quantization parameter (QP) (e.g., cu_qp_delta_palette_abs, cu_qp_delta_palette_sign_flag, cu_chroma_qp_palette_offset_flag, and/or cu_chroma_qp_palette_offset_idx), one or more syntax elements related to chroma QP offsets for the current block of video data, one or more syntax elements that indicate a number of zeros that precede a non-zero entry in an array that indicates whether entries from a predictor palette are reused in the current palette (e.g., palette_predictor_run), one or more syntax elements that indicate a number of entries in the current palette that are explicitly signalled (e.g., num_signalled_palette_entries), one or more syntax elements that indicate a value of a component in a palette entry in the current palette (e.g., palette_entry), one or more syntax elements that indicate whether the current block of video data includes at least one escape coded sample (e.g., palette_escape_val_present_flag), one or more syntax elements that indicate a number of entries in the current palette that are explicitly signalled or inferred (e.g., num_palette_indices_idc), and one or more syntax elements that indicate indices in an array of current palette entries (e.g., palette_index_idc). Palette-based encoding unit 122 may output the generated syntax elements that define the current palette for the current block to one or more other components of video encoder 20, such as entropy encoding unit 118.

Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements.

Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra-prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

As discussed above, palette-based encoding unit 122 may output the generated syntax elements that define the current palette for the current block to entropy encoding unit 118. Entropy encoding unit 118 may encode one or more bins of the syntax elements received from palette-based encoding unit 122 using CABAC with contexts and one or more bins of the syntax elements received from palette-based encoding unit 122 using CABAC without contexts (i.e., bypass mode). In some examples, entropy encoding unit 118 may encode the bins of the syntax elements using contexts or bypass mode as defined above in Table 2.

As discussed above, it may be desirable to group bypass coded bins together to increase CABAC throughput. In SCC Draft 3, the bins of the palette_predictor_run, num_signalled_palette_entries, palette_entry, and palette_escape_val_present_flag syntax elements are bypass coded and are grouped together. However, while the bins of the num_palette_indices_idc, and palette_index_idc syntax elements are also bypass coded, they are not grouped with the bins of the palette_predictor_run, num_signalled_palette_entries, palette_entry, and palette_escape_val_present_flag syntax elements. Instead, in HEVC SCC Draft 3, the num_palette_indices_idc, and palette_index_idc syntax elements are separated from the palette_predictor_run, num_signalled_palette_entries, palette_entry, and palette_escape_val_present_flag syntax elements by one or more syntax elements related to delta quantization parameter (QP) and/or chroma QP offsets for a current block of video data (i.e., cu_qp_delta_palette_abs, cu_qp_delta_palette_sign_flag, cu_chroma_qp_palette_offset_flag, and cu_chroma_qp_palette_offset_idx) and a syntax element that indicates whether a transpose process is applied to the palette indices of the palette for the current block of video data (i.e., palette_transpose_flag).

In accordance with one or more techniques of this disclosure, entropy encoding unit 118 may encode the syntax elements used to define a current palette such that syntax elements that are encoded using bypass mode are consecutively encoded. For instance, as opposed to separating the bins of the palette_predictor_run, num_signalled_palette_entries, palette_entry, and palette_escape_val_present_flag syntax elements and the bins of the num_palette_indices_idc, and palette_index_idc syntax elements, entropy encoding unit 118 may encode one or more syntax elements related to delta QP and/or chroma QP offsets for the current block of video data after a syntax element that indicates whether a transpose process is applied to the palette indices of the palette for the current block of video data such that the bins of the palette_predictor_run, num_signalled_palette_entries, palette_entry, and palette_escape_val_present_flag, num_palette_indices_idc, and palette_index_idc syntax elements are grouped together. In this way, the CABAC throughput of entropy encoding unit 118 may be increased.

Figure 3:
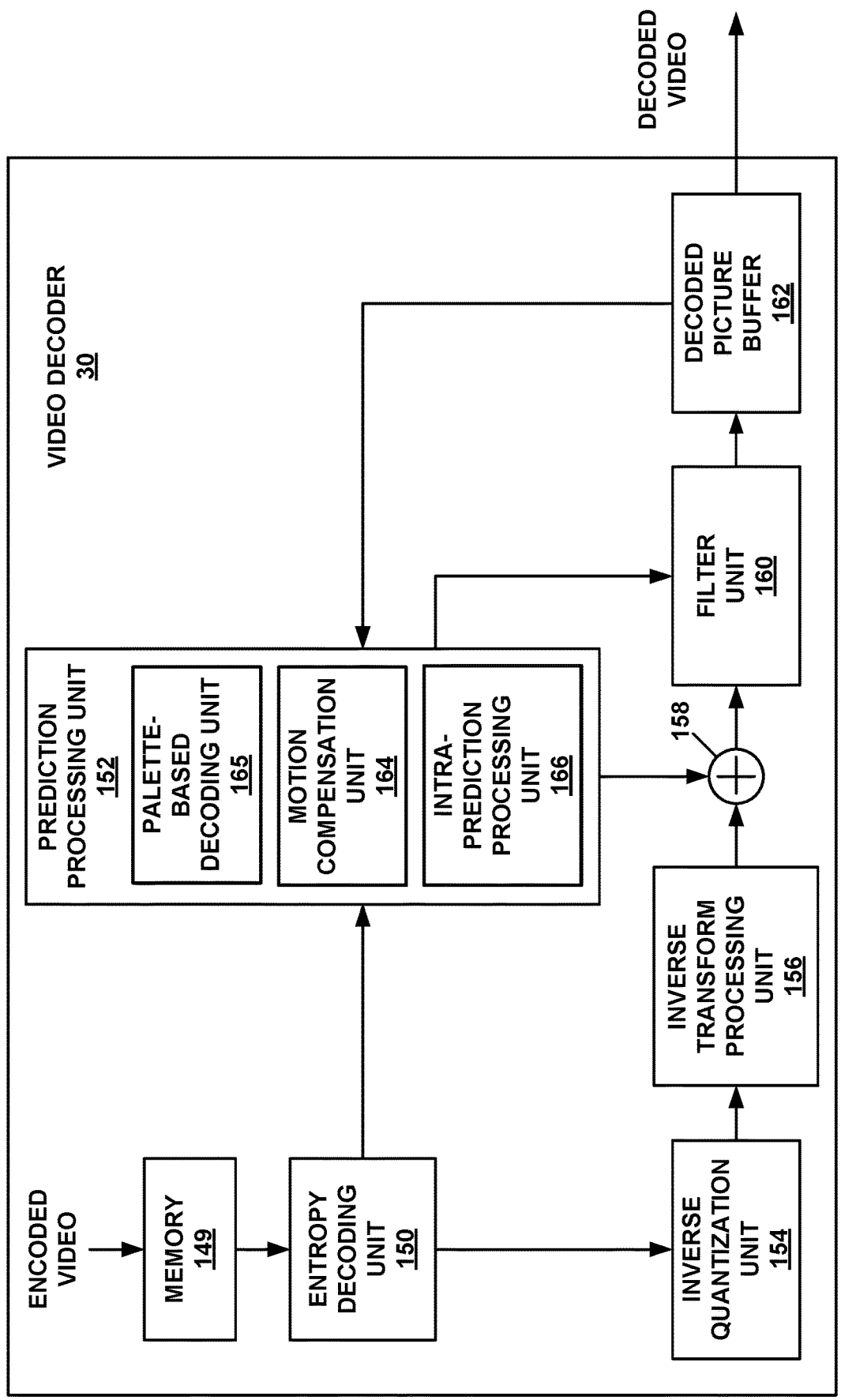
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by the HEVC Standard. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

In some examples, video decoder 30 may further include video data memory 149. Video data memory 149 may store video data, such as an encoded video bitstream, to be decoded by the components of video decoder 30. The video data stored in video data memory 149 may be obtained, for example, from channel 16, e.g., from a local video source, such as a camera, via wired or wireless network communication of video data, or by accessing physical data storage media. Video data memory 149 may form a coded picture buffer (CPB) that stores encoded video data from an encoded video bitstream. The CPB may be a reference picture memory that stores reference video data for use in decoding video data by video decoder 30, e.g., in intra- or inter-coding modes. Video data memory 149 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 149 and decoded picture buffer 162 may be provided by the same memory device or separate memory devices. In various examples, video data memory 149 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent an original sequence and the compressed sequence, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such an HEVC inter-predictive mode using motion compensation unit 164 or intra-predictive coding mode using intra-prediction processing unit 166, when the palette coding mode information indicates that the palette coding mode does not apply to the block. The block of video data may be, for example, a CU or PU generated according to an HEVC coding process. Video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

The palette coding mode information received by palette-based decoding unit 165 may comprise a palette mode syntax element, such as a flag. A first value of the palette mode syntax element indicates that the palette coding mode applies to the block and a second value of the palette mode syntax element indicates that the palette coding mode does not apply to the block of video data. Palette-based decoding unit 165 may receive the palette coding mode information at one or more of a predictive unit level, a coding unit level, a slice level, or a picture level, or may receive the palette coding mode information in at least one of picture parameter set (PPS), sequence parameter set (SPS) or video parameter set (VPS).

In some examples, palette-based decoding unit 165 may infer the palette coding mode information based on one or more of a size of the coding block, a frame type, a color space, a color component, a frame size, a frame rate, a layer id in scalable video coding or a view id in multi-view coding associated with the block of video data.

Palette-based decoding unit 165 also may be configured to receive information defining at least some of the entries in the palette with video data, and generate the palette based at least in part on the received information. The size of the palette may be fixed or variable. In some cases, the size of the palette is variable and is adjustable based on information signaled with the video data. The signaled information may specify whether an entry in the palette is a last entry in the palette. Also, in some cases, the palette may have a maximum size.

The palette may be a single palette including entries indicating pixel values for a luma component and chroma components of the block. In this case, each entry in the palette is a triple entry indicating pixel values for the luma component and two chroma components. Alternatively, the palette comprises a luma palette including entries indicating pixel values of a luma component of the block, and chroma palettes including entries indicating pixel values for respective chroma components of the block.

In some examples, palette-based decoding unit 165 may generate the palette by predicting the entries in the palette based on previously processed data. The previously processed data may include palettes, or information from palettes, for previously decoded neighboring blocks. Palette-based decoding unit 165 may receive a prediction syntax element indicating whether the entries in the palette are to be predicted. The prediction syntax element may include a plurality of prediction syntax elements indicating, respectively, whether entries in palettes for luma and chroma components are to be predicted.

Palette-based decoding unit 165 may, in some examples, predict at least some of the entries in the palette based on entries in a palette for a left neighbor block or a top neighbor block in a slice or picture. In this case, the entries in the palette that are predicted based on entries in either a palette for the left neighbor block or the top neighbor block may be predicted by palette-based decoding unit 165 based on a syntax element that indicates selection of the left neighbor block or the top neighbor block for prediction. The syntax element may be a flag having a value that indicates selection of the left neighbor block or the top neighbor block for prediction.

In some examples, palette-based decoding unit 165 may receive one or more prediction syntax elements that indicate whether at least some selected entries in the palette, on an entry-by-entry basis, are to be predicted, and generate the entries accordingly. Palette-based decoding unit 165 may predict some of the entries and receive information directly specifying other entries in the palette.

Information, received by palette-based decoding unit 165, associating at least some positions of a block of video data with entries in the palette, may comprise map information including palette index values for at least some of the positions in the block, wherein each of the palette index values corresponds to one of the entries in the palette. The map information may include one or more run syntax elements that each indicate a number of consecutive positions in the block having the same palette index value.

In some examples, palette-based decoding unit 165 may receive information indicating line copying whereby palette entries for a line of positions in the block are copied from palette entries for another line of positions in the block. Palette-based decoding unit 165 may use this information to perform line copying to determine entries in the palette for various positions of a block. The line of positions may comprise a row, a portion of a row, a column or a portion of a column of positions of the block.

Palette-based decoding unit 165 may generate the palette in part by receiving pixel values for one or more positions of the block, and adding the pixel values to entries in the palette to dynamically generate at least a portion the palette on-the-fly. Adding the pixel values may comprise adding the pixel values to an initial palette comprising an initial set of entries, or to an empty palette that does not include an initial set of entries. In some examples, adding comprises adding the pixel values to add new entries to an initial palette comprising an initial set of entries or fill existing entries in the initial palette, or replacing or changing pixel values of entries in the initial palette.

In some examples, the palette may be a quantized palette in which a pixel value selected from the palette for one of the positions in the block is different from an actual pixel value of the position in the block, such that the decoding process is lossy. For example, the same pixel value may be selected from the palette for two different positions having different actual pixel values.

As discussed above, palette-based decoding unit 165 may receive information that defines a palette for a current block of video data. For instance, palette-based decoding unit 165 may receive a plurality of syntax elements from entropy decoding unit 150. In some examples, entropy decoding unit 150 may decode the plurality of syntax elements from a coded video bitstream according to a syntax table. As one example, entropy decoding unit 150 may decode the plurality of syntax elements from a coded video bitstream in accordance with the palette syntax table of HEVC SCC Draft 3, which is reproduced above in Table 1. However, as discussed above, the arrangement of syntax elements in HEVC SCC Draft 3 may not be optimal. In particular, the arrangement of syntax elements in HEVC SCC Draft 3 does not maximize the number of bypass mode coded syntax elements that are grouped together, which may decrease CABAC throughput.

In accordance with one or more techniques of this disclosure, entropy decoding unit 150 may decode the syntax elements used to define a current palette such that additional bypass mode coded syntax elements are grouped together. For instance, as opposed to separating the bins of the palette_predictor_run, num_signalled_palette_entries, palette_entry, and palette_escape_val_present_flag syntax elements and the bins of the num_palette_indices_idc, and palette_index_idc syntax elements, entropy decoding unit 150 may decode one or more syntax elements related to delta QP and/or chroma QP offsets for the current block of video data after a syntax element that indicates whether a transpose process is applied to the palette indices of the palette for the current block of video data such that the bins of the palette_predictor_run, num_signalled_palette_entries, palette_entry, and palette_escape_val_present_flag, num_palette_indices_idc, and palette_index_idc syntax elements are grouped together. As one example, entropy decoding unit 150 may decode the syntax elements used to define the current palette in the order shown above in Table 4. As another example, entropy decoding unit 150 may decode the syntax elements used to define the current palette in the order shown above in Table 5. In this way, the CABAC throughput of entropy decoding unit 150 may be increased.

Figure 4:
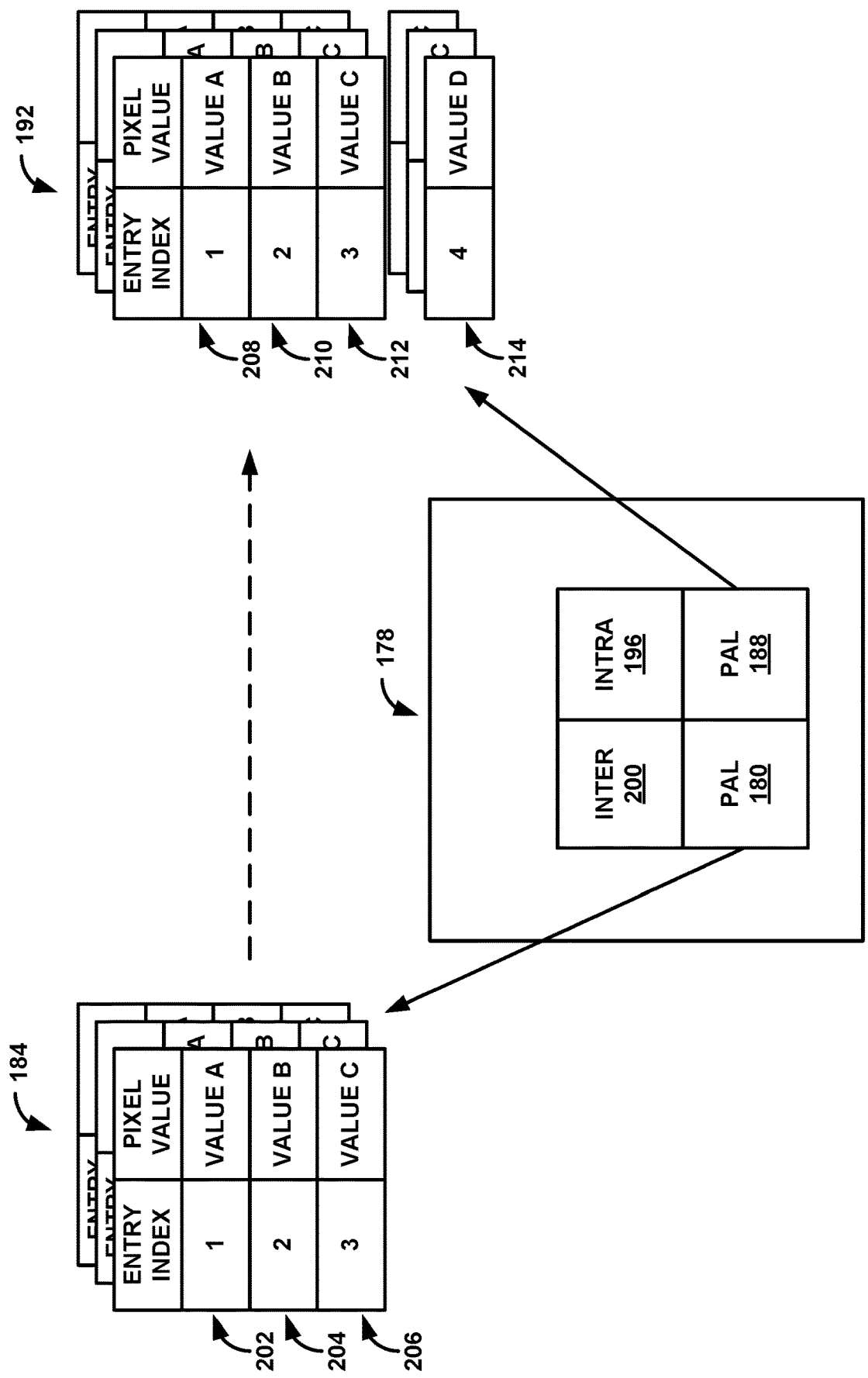
FIG. 4 is a conceptual diagram illustrating an example of determining a palette for coding video data, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC Standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, such as CU 188 in the example of FIG. 4. First palettes 184 and second palettes 192 are shown as including multiple palettes. In some examples, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU. In another example, video encoder 20 may encode a palette for a luma (Y) component of a CU, and another palette for two components (U, V) of the CU. In this example, entries of the Y palette may represent Y values of pixels of the CU, and entries of the U-V palette may represent U-V value pairs of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding. In general, one or more palettes may be transmitted for each CU or may be shared among different CUs.

Video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palette 192 for second CU 188 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is, a flag may be signaled for each entry of a palette predictor to indicate whether that entry is present in the current palette. As noted above, if a palette entry is not predicted, the palette entry may be explicitly signaled.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictor palette. In some examples, such as the example illustrated in FIG. 4, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 4 illustrates first palettes 184 as predictive palettes from a single CU, first CU 180, in other examples, video encoder 20 and/or video decoder 30 may locate palettes for prediction from a combination of neighboring CUs. For example, video encoder 20 and/or video decoder may apply one or more formulas, functions, rules or the like to generate a palette based on palettes of one or a combination of a plurality of neighboring CUs.

In still other examples, video encoder 20 and/or video decoder 30 may construct a candidate list including a number of potential candidates for palette prediction. A pruning process may be applied at both video encoder 20 and video decoder 30 to remove duplicated candidates in the list. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

In some examples, video encoder 20 and/or video decoder 30 may perform entry-wise based palette prediction. For example, video encoder 20 may encode one or more syntax elements, such as one or more flags, for each entry of a predictive palette indicating whether the respective predictive palette entries are reused in the current palette (e.g., whether pixel values in a palette of another CU are reused by the current palette). In this example, video encoder 20 may encode a flag having a value equal to one for a given entry when the entry is a predicted value from a predictive palette (e.g., a corresponding entry of a palette associated with a neighboring CU). Video encoder 20 may encode a flag having a value equal to zero for a particular entry to indicate that the particular entry is not predicted from a palette of another CU. In this example, video encoder 20 may also encode additional data indicating the value of the non-predicted palette entry.

In the example of FIG. 4, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. Video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictor palette and the pixel values corresponding to those palette entries.

In some examples, according to aspects of this disclosure, one or more syntax elements may indicate whether palettes, such as second palettes 192, are predicted entirely from a predictive palette (shown in FIG. 4 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements), video encoder 20 and video decoder 30 may perform palette prediction based on one or more characteristics of the data being coded.

Figure 5:
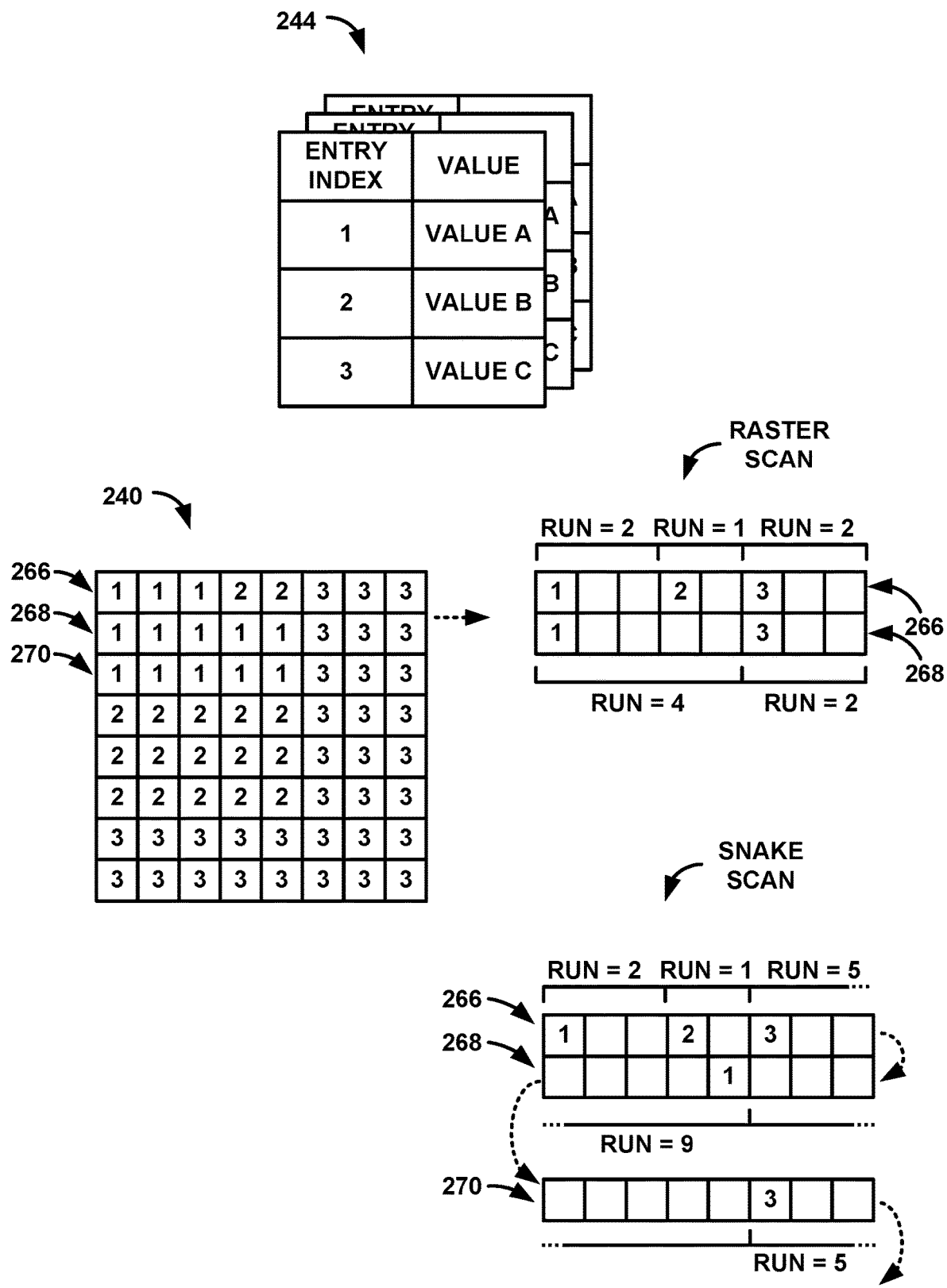
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 4.

Again, the techniques of FIG. 5 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

The number of indices that may be included in a run may be impacted by the scan order. For example, consider a raster scan of lines 266, 268, and 270 of map 240. Assuming a horizontal, left to right scan direction (such as a raster scanning order), row 266 includes three index values of "1," two index values of "2," and three index values of "3." Row 268 includes five index values of "1" and three index values of "3." In this example, for row 266, video encoder 20 may encode syntax elements indicating that the first value of row 266 (the leftmost value of the row) is 1 with a run of 2, followed by an index value of 2 with a run of 1, followed by an index value of 3 with a run of 2. Following the raster scan, video encoder 20 may then begin coding row 268 with the leftmost value. For example, video encoder 20 may encode syntax elements indicating that the first value of row 268 is 1 with a run of 4, followed by an index value of 3 with a run of 2. Video encoder 20 may proceed in the same manner with line 270.

Hence, in the raster scan order, the first index of a current line may be scanned directly after the last index of a previous line. However, in some examples, it may not be desirable to scan the indices in a raster scan order. For instance, it may not be desirable to scan the indices in a raster scan order where a first line of a block of video data (e.g., row 266) includes a first pixel adjacent to a first edge of the block of video data (e.g., the left most pixel of row 266, which has an index value of 1) and a last pixel adjacent to a second edge of the block of video data (e.g., the right most pixel of row 266, which has an index value of 3), a second line of the block of video data (e.g., row 268) includes a first pixel adjacent to the first edge of the block of video data (e.g., the left most pixel of row 268, which has an index value of 1) and a last pixel adjacent to the second edge of the block of video data (e.g., the right most pixel of row 268, which has an index value of 3), the last pixel of the first line is adjacent to the last pixel of the second line, and the first edge and the second edge are parallel, and the last pixel in the first line has the same index value as the last pixel in the second line, but has a different index value from the first pixel in the second line. This situation (i.e., where the index value of last pixel in the first line is the same as the last pixel in the second line, but different from the first pixel in the second line) may occur more frequently in computer generated screen content than other types of video content.

In some examples, video encoder 20 may utilize a snake scan order when encoding the indices of the map. For instance, video encoder 20 may scan the last pixel of the second line directly after the last pixel of the first line. In this way, video encoder 20 may improve the efficiency of run-length coding.

For example, as opposed to using a raster scan order, video encoder 20 may use a snake scan order to code the values of map 240. In an example for purposes of illustration, consider rows 266, 268, and 270 of map 240. Using a snake scan order (such as a snake scanning order), video encoder 20 may code the values of map 240 beginning with the left position of row 266, proceeding through to the right most position of row 266, moving down to the left most position of row 268, proceeding through to the left most position of row 268, and moving down to the left most position of row 270. For instance, video encoder 20 may encode one or more syntax elements indicating that the first position of row 266 is one and that the next run of two consecutive entries in the scan direction are the same as the first position of row 266.

Video encoder 20 may encode one or more syntax elements indicating that the next position of row 266 (i.e., the fourth position, from left to right) is two and that the next consecutive entry in the scan direction are the same as the fourth position of row 266. Video encoder 20 may encode one or more syntax elements indicating that the next position of row 266 (i.e., the sixth position) is three and that the next run of five consecutive entries in the scan direction are the same as the sixth position of row 266. Video encoder 20 may encode one or more syntax elements indicating that the next position in the scan direction (i.e., the fourth position of row 268, from right to left) of row 268 is one and that the next run of nine consecutive entries in the scan direction are the same as the fourth position of row 268.

In this way, by using a snake scan order, video encoder 20 may encode longer length runs, which may improve coding efficiency. For example, using the raster scan, the final run of row 266 (for the index value 3) is equal to 2. Using the snake scan, however, the final run of row 266 extends into row 268 and is equal to 5.

Video decoder 30 may receive the syntax elements described above and reconstruct rows 266, 268, and 270. For example, video decoder 30 may obtain, from an encoded bitstream, data indicating an index value for a position of map 240 currently being coded. Video decoder 30 may also obtain data indicating the number of consecutive positions in the scan order having the same index value.

Figure 6:
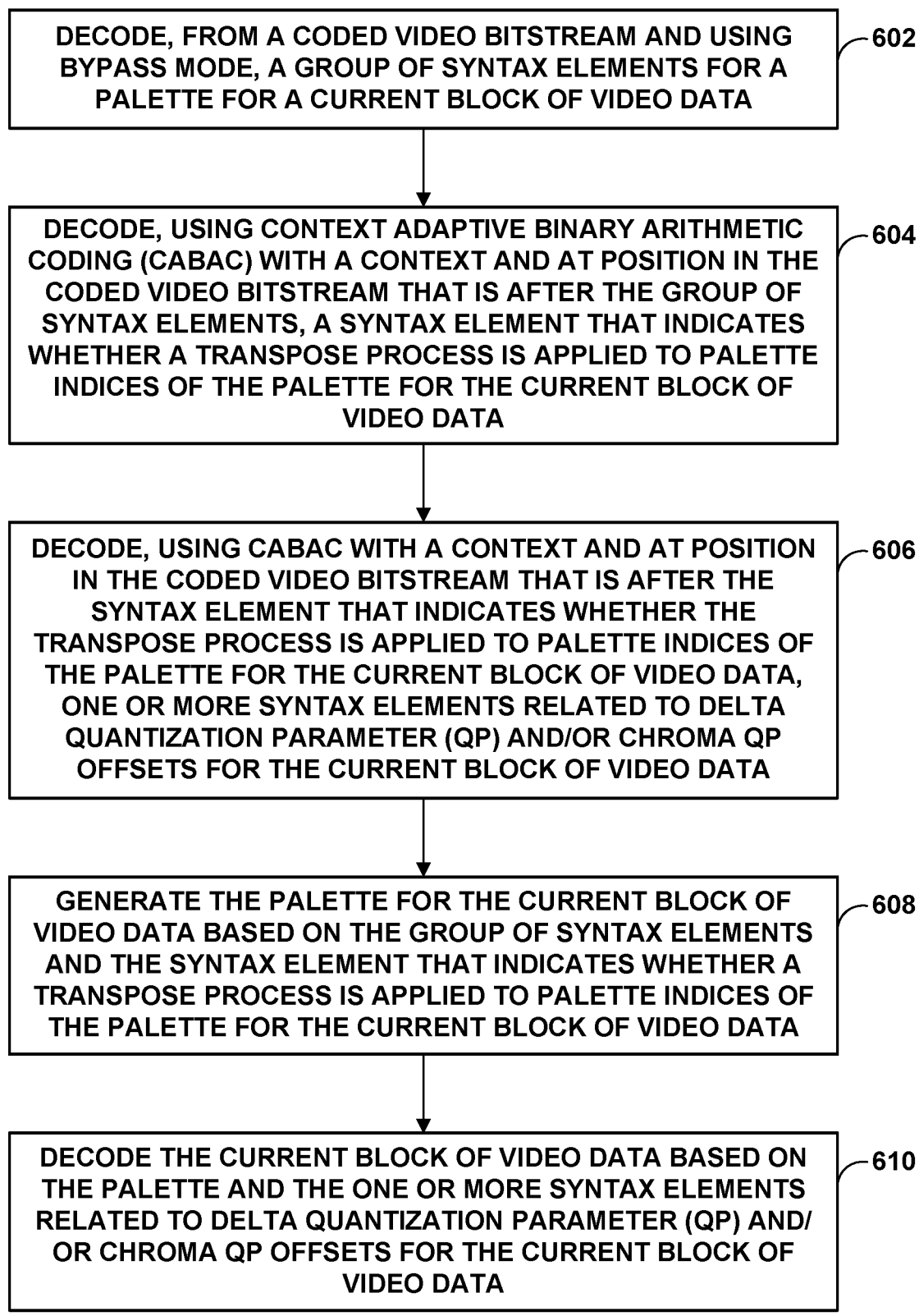
FIG. 6 is a flowchart illustrating an example process for decoding a block of video data using palette mode, in accordance with one or more techniques of this disclosure.

FIG. 6 is a flowchart illustrating an example process for decoding a block of video data using palette mode, in accordance with one or more techniques of this disclosure. The techniques of FIG. 6 may be performed by a video decoder, such as video decoder 30 illustrated in FIG. 1 and FIG. 3. For purposes of illustration, the techniques of FIG. 6 are described within the context of video decoder 30 of FIG. 1 and FIG. 3, although video decoders having configurations different than that of video decoder 30 may perform the techniques of FIG. 6.

As discussed above, it may be desirable to maximize the number of bypass mode coded bins of syntax elements that are grouped together. In accordance with one or more techniques of this disclosure, video decoder 30 may decode, from a coded video bitstream and using bypass mode, a group of syntax elements for a palette for a current block of video data (602). For instance, entropy decoding unit 150 of video decoder 30 may decode, using bypass mode, bins of one or more syntax elements that indicate a number of zeros that precede a non-zero entry in an array that indicates whether entries from a predictor palette are reused in the current palette (e.g., one or more palette_predictor_run syntax elements), a syntax element that indicates a number of entries in the current palette that are explicitly signalled (e.g., a num_signalled_palette_entries syntax element), one or more syntax elements that each indicate a value of a component in an entry in the current palette (e.g., one or more palette_entry syntax elements), a syntax element that indicates whether the current block of video data includes at least one escape coded sample (e.g., a palette_escape_val_present_flag syntax element), a syntax element that indicates a number of entries in the current palette that are explicitly signalled or inferred (e.g., a num_palette_indices_idc syntax element), and one or more syntax elements that indicate indices in an array of current palette entries (e.g., one or more palette_index_idc syntax elements). In some examples, to decode a group of bypass-coded syntax elements, video decoder 30 may sequentially decode syntax elements included in the group of syntax elements without decoding any non-bypass coded bins. As discussed above, grouping together a large number of bypass coded bins/syntax elements may improve a CABAC throughput of video decoder 30. In particular, the grouping of bypass-coded syntax elements may enable video decoder 30 to avoid starting/stopping/restarting the CABAC engine. By contrast, when the bypass-coded syntax elements are not grouped, video decoder 30 may have to continually start the CABAC engine to decode a non-bypass-coded bin with a first context, stop the CABAC engine to decode a bypass-coded bin, start the CABAC engine to decode another non-bypass-coded bin with the first context, etc. As discussed above, the repeated toggling of the CABAC engine may decrease the CABAC engine's throughput.

Video decoder 30 may decode, using CABAC with a context and at a position in the coded video bitstream that is after the group of syntax elements, a syntax element that indicates whether a transpose process is applied to palette indices of the palette for the current block of video data (604). For instance, entropy decoding unit 150 of video decoder 30 may decode, using CABAC with a context, the bin of a palette_transpose_flag syntax element.

Video decoder 30 may decode, using CABAC with a context and at a position in the coded video bitstream that is after the syntax element that indicates whether a transpose process is applied to palette indices of the palette for the current block of video data, one or more syntax elements related to delta quantization parameter (QP) and/or chroma QP offsets for the current block of video data (606). For instance, entropy decoding unit 150 of video decoder 30 may decode, using CABAC with one or more contexts, bins of a syntax elements that specifies the absolute value of a difference between a QP (e.g., a luma QP) for the current block of video data and a predictor of the QP for the current block (e.g., cu_qp_delta_abs), a syntax element that specifies a sign of the difference between the QP for the current block of video data and the predictor of the QP for the current block (e.g., cu_qp_delta_sign_flag), a syntax element that indicates whether entries in one or more offset lists are added to a luma QP for the current block to determine chroma QPs for the current block (e.g., cu_chroma_qp_offset_flag), and a syntax element that specifies an index of an entry in each of the one or more offset lists that are added to the luma QP for the current block to determine chroma QPs for the current block (e.g., cu_chroma_qp_offset_idx).

In some examples, video decoder 30 may decode the one or more syntax elements related to delta QP and/or chroma QP offsets for the current block of video data based on a value of a syntax element of the group of syntax elements decoded using bypass mode. As one example, video decoder 30 may decode the one or more syntax elements related to delta QP and/or chroma QP offsets for the current block of video data where the syntax element of the group of syntax elements that indicates whether the current block of video data includes at least one escape coded sample indicates that the current block of video data does include at least one escape sample. As another example, video decoder 30 may not decode the one or more syntax elements related to delta QP and/or chroma QP offsets for the current block of video data where the syntax element of the group of syntax elements that indicates whether the current block of video data includes at least one escape coded sample indicates that the current block of video data does not include at least one escape sample.

Video decoder 30 may generate the palette for the current block of video data based on the group of syntax elements and the syntax element that indicates whether a transpose process is applied to palette indices of the palette for the current block of video data (608) and decode the current block of video data based on the generated palette and the one or more syntax elements related to delta QP and/or chroma QP offsets for the current block of video data (610). For instance, palette-based decoding unit 165 may generate the palette having entries indicating pixel values, receive information associating at least some positions of the current block of video data with entries in the palette, select pixel values in the palette based on the information, and reconstruct pixel values of the block based on the selected pixel values.

Figure 7:
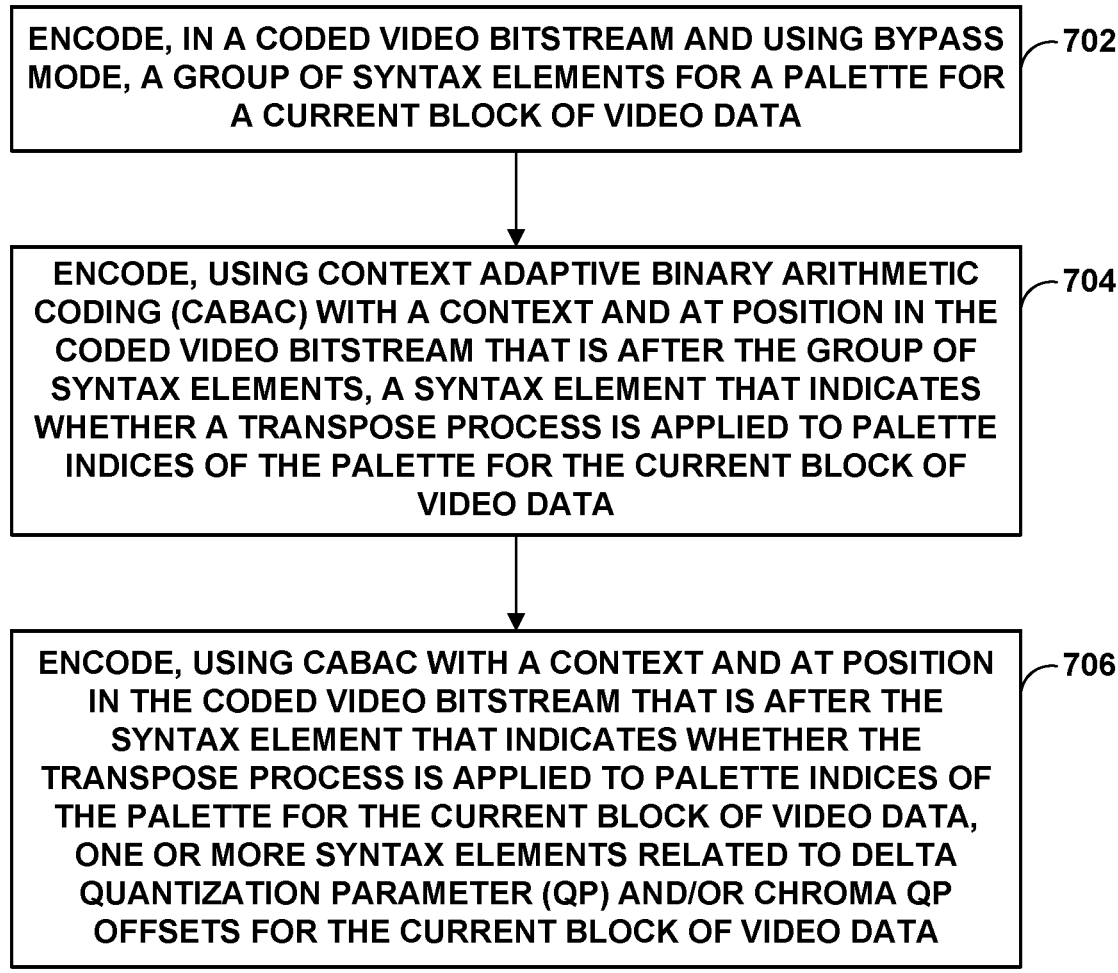
FIG. 7 is a flowchart illustrating an example process for encoding a block of video data using palette mode, in accordance with one or more techniques of this disclosure.

FIG. 7 is a flowchart illustrating an example process for encoding a block of video data using palette mode, in accordance with one or more techniques of this disclosure. The techniques of FIG. 7 may be performed by a video encoder, such as video encoder 20 illustrated in FIG. 1 and FIG. 2. For purposes of illustration, the techniques of FIG. 7 are described within the context of video encoder 20 of FIG. 1 and FIG. 2, although video encoders having configurations different than that of video encoder 20 may perform the techniques of FIG. 7.

As discussed above, it may be desirable to maximize the number of bypass mode coded bins of syntax elements that are grouped together. In accordance with one or more techniques of this disclosure, video encoder 20 may encode, in a coded video bitstream and using bypass mode, a group of syntax elements for a palette for a current block of video data (702). For instance, entropy encoding unit 118 of video encoder 20 may encode, using bypass mode, bins of one or more syntax elements that indicate a number of zeros that precede a non-zero entry in an array that indicates whether entries from a predictor palette are reused in the current palette (e.g., one or more palette_predictor_run syntax elements), a syntax element that indicates a number of entries in the current palette that are explicitly signalled (e.g., a num_signalled_palette_entries syntax element), one or more syntax elements that each indicate a value of a component in an entry in the current palette (e.g., one or more palette_entry syntax elements), a syntax element that indicates whether the current block of video data includes at least one escape coded sample (e.g., a palette_escape_val_present_flag syntax element), a syntax element that indicates a number of entries in the current palette that are explicitly signalled or inferred (e.g., a num_palette_indices_idc or a num_palette_indices_minus1 syntax element), and one or more syntax elements that indicate indices in an array of current palette entries (e.g., one or more palette_index_idc syntax elements).

Video encoder 20 may encode, using CABAC with a context and at a position in the coded video bitstream that is after the group of syntax elements, a syntax element that indicates whether a transpose process is applied to palette indices of the palette for the current block of video data (704). For instance, entropy encoding unit 118 of video encoder 20 may encode, using CABAC with a context, the bin of a palette_transpose_flag syntax element.

Video encoder 20 may encode, using CABAC with a context and at a position in the coded video bitstream that is after the syntax element that indicates whether a transpose process is applied to palette indices of the palette for the current block of video data, one or more syntax elements related to delta quantization parameter (QP) and/or chroma QP offsets for the current block of video data (706). For instance, entropy encoding unit 118 of video encoder 20 may encode, using CABAC with one or more contexts, bins of a syntax elements that specifies the absolute value of a difference between a luma QP for the current block of video data and a predictor of the luma QP for the current block (e.g., cu_qp_delta_abs), a syntax element that specifies a sign of the difference between the luma QP for the current block of video data and the predictor of the luma QP for the current block (e.g., cu_qp_delta_sign_flag), a syntax element that indicates whether entries in one or more offset lists are added to the luma QP for the current block to determine chroma QPs for the current block (e.g., cu_chroma_qp_offset_flag), and a syntax element that specifies an index of an entry in each of the one or more offset lists that are added to the luma QP for the current block to determine chroma QPs for the current block (e.g., cu_chroma_qp_offset_idx).

In some examples, video encoder 20 may encode the one or more syntax elements related to delta QP and/or chroma QP offsets for the current block of video data based on a value of a syntax element of the group of syntax elements encoded using bypass mode. As one example, video encoder 20 may encode the one or more syntax elements related to delta QP and/or chroma QP offsets for the current block of video data where the syntax element of the group of syntax elements that indicates whether the current block of video data includes at least one escape coded sample indicates that the current block of video data does include at least one escape sample. As another example, video encoder 20 may not encode the one or more syntax elements related to delta QP and/or chroma QP offsets for the current block of video data where the syntax element of the group of syntax elements that indicates whether the current block of video data includes at least one escape coded sample indicates that the current block of video data does not include at least one escape sample.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, in accordance with a syntax table that specifies a parsing order for a coded video bitstream and using context adaptive binary arithmetic coding (CABAC) with a context, a syntax element from the coded video bitstream that indicates whether a transpose process is applied to palette indices of a current palette for a current block of video data;
    decoding, in accordance with the syntax table and from the coded video bitstream and using CABAC with a context, one or more syntax elements related to delta quantization parameter (QP) and/or chroma QP offsets for the current block of video data, wherein the syntax table specifies that the one or more syntax elements related to delta quantization parameter (QP) and/or chroma QP offsets for the current block of video data are parsed after the syntax element that indicates whether the transpose process is applied to palette indices of the current palette for the current block of video data;
    decoding, in accordance with the syntax table and from the coded video bitstream, a group of syntax elements using Bypass mode, wherein the group of syntax elements comprises:
        one or more syntax elements that indicate a number of zeros that precede a non-zero entry in an array that indicates whether entries from a predictor palette are reused in the current palette;
        a syntax element that indicates a number of entries in the current palette that are explicitly signalled;
        one or more syntax elements that each indicate a value of a component in an entry in the current palette;
        a syntax element that indicates whether the current block of video data includes at least one escape coded sample;
        a syntax element that indicates a number of indices in the current palette that are explicitly signalled or inferred; and
        one or more syntax elements that indicate indices in an array of entries of the current palette; and
    decoding the current block of video data based on the current palette for the current block of video data, the group of syntax elements, and the one or more syntax elements related to delta QP and/or chroma QP offsets for the current block of video data.

2. The method of claim 1, wherein the syntax element that indicates whether the transpose process is applied to palette indices of the current palette of the current block of video data comprises a palette_transpose_flag syntax element.

3. The method of claim 1, wherein the one or more syntax elements related to delta QP comprise one or both of a syntax element that indicates an absolute value of a difference between a QP of the current block and a predictor of the QP of the current block and a syntax element that indicates a sign of the difference between the QP of the current block and the predictor of the QP of the current block.

4. The method of claim 1, wherein the one or more syntax elements related to chroma QP offsets comprise one or both of a syntax element that indicates whether entries in one or more offset lists are added to a luma QP of the current block to determine chroma QPs for the current block and a syntax element that indicates an index of an entry in each of the one or more offset lists that are added to the luma QP for the current block to determine the chroma QPs for the current block.

5. The method of claim 1, wherein one or more of:
    the one or more syntax elements that indicate a number of zeros that precede a non-zero entry in an array that indicates whether entries from a predictor palette are reused in the current palette comprise one or more palette_predictor_run syntax elements,
    the syntax element that indicates a number of entries in the current palette that are explicitly signalled comprises a num_signalled_palette_entries syntax element,
    the one or more syntax elements that each indicate a value of a component in an entry in the current palette comprise one or more palette_entry syntax elements,
    the syntax element that indicates whether the current block of video data includes at least one escape coded sample comprises palette_escape_val_present_flag,
    the syntax element that indicates a number of indices in the current palette that are explicitly signalled or inferred comprise a num_palette_indices_idc syntax element, and
    the one or more syntax elements that indicate indices in an array of entries of the current palette comprise one or more palette_index_idc syntax elements.

6. The method of claim 1, wherein the syntax table specifies that the group of syntax elements are parsed from the coded video bitstream before the syntax element that indicates whether the transpose process is applied to palette indices of the current palette of the current block of video data.

7. The method of claim 1, further comprising:
    decoding, in accordance with the syntax table and from the coded video bitstream, a syntax element that indicates a last occurrence of a run type flag within the current block of video data, wherein the syntax table specifies that the syntax element that indicates the last occurrence of the run type flag within the current block of video data is parsed after the group of syntax elements coded using Bypass mode.

8. The method of claim 7, wherein decoding the syntax element that indicates the last occurrence of a run type flag within the current block of video data comprises decoding the syntax element that indicates the last occurrence of a run type flag within the current block of video data using context adaptive binary arithmetic coding (CABAC) with a context.

9. A method of encoding video data, the method comprising:
    encoding, in accordance with a syntax table that specifies a coding order for a coded video bitstream and using context adaptive binary arithmetic coding (CABAC) with a context, a syntax element in the coded video bitstream that indicates whether a transpose process is applied to palette indices of a current palette for a current block of video data;
    encoding, in accordance with the syntax table and in the coded video bitstream, one or more syntax elements related to delta quantization parameter (QP) and/or chroma QP offsets for the current block of video data, wherein the syntax table specifies that the one or more syntax elements related to delta quantization parameter (QP) and/or chroma QP offsets for the current block of video data are encoded after the syntax element that indicates whether the transpose process is applied to palette indices of the current palette for the current block of video data;

encoding, in accordance with the syntax table and in the coded video bitstream, a group of syntax elements using Bypass mode, wherein the group of syntax elements comprises:
- one or more syntax elements that indicate a number of zeros that precede a non-zero entry in an array that indicates whether entries from a predictor palette are reused in the current palette;
- a syntax element that indicates a number of entries in the current palette that are explicitly signalled;
- one or more syntax elements that each indicate a value of a component in an entry in the current palette;
- a syntax element that indicates whether the current block of video data includes at least one escape coded sample;
- a syntax element that indicates a number of indices in the current palette that are explicitly signalled or inferred; and
- one or more syntax elements that indicate indices in an array of entries of the current palette; and encoding the current block of video data based on the current palette for the current block of video data, the group of syntax elements, and the one or more syntax elements related to delta QP and/or chroma QP offsets for the current block of video data.

10. The method of claim 9, wherein the syntax element that indicates whether the transpose process is applied to palette indices of the current palette of the current block of video data comprises a palette_transpose_flag syntax element.

11. The method of claim 9, wherein the one or more syntax elements related to delta QP comprise one or both of a syntax element that indicates an absolute value of a difference between a QP of the current block and a predictor of the QP of the current block and a syntax element that indicates a sign of the difference between the QP of the current block and the predictor of the QP of the current block.

12. The method of claim 9, wherein the one or more syntax elements related to chroma QP offsets comprise one or both of a syntax element that indicates whether entries in one or more offset lists are added to a luma QP of the current block to determine chroma QPs for the current block and a syntax element that indicates an index of an entry in each of the one or more offset lists that are added to the luma QP for the current block to determine the chroma QPs for the current block.

13. The method of claim 9, wherein one or more of:
- the one or more syntax elements that indicate a number of zeros that precede a non-zero entry in an array that indicates whether entries from a predictor palette are reused in the current palette comprise one or more palette_predictor_run syntax elements,
- the syntax element that indicates a number of entries in the current palette that are explicitly signalled comprises a num_signalled_palette_entries syntax element,
- the one or more syntax elements that each indicate a value of a component in an entry in the current palette comprise one or more palette_entry syntax elements,
- the syntax element that indicates whether the current block of video data includes at least one escape coded sample comprises palette_escape_val_present_flag,
- the syntax element that indicates a number of indices in the current palette that are explicitly signalled or inferred comprise a num_palette_indices_minus1 syntax element, and
- the one or more syntax elements that indicate indices in an array of entries of the current palette comprise one or more palette_index_idc syntax elements.

14. The method of claim 9, wherein the syntax table specifies that the group of syntax elements is encoded before the syntax element that indicates whether the transpose process is applied to palette indices of the current palette of the current block of video data.

15. The method of claim 9, further comprising:
encoding, in accordance with the syntax table and in the coded video bitstream, a syntax element that indicates a last occurrence of a run type flag within the current block of video data, wherein the syntax table specifies that the syntax element that indicates the last occurrence of the run type flag within the current block of video data is parsed after the group of syntax elements coded using Bypass mode.

16. The method of claim 15, wherein encoding the syntax element that indicates the last occurrence of a run type flag within the current block of video data comprises encoding the syntax element that indicates the last occurrence of a run type flag within the current block of video data using context adaptive binary arithmetic coding (CABAC) with a context.

17. A device for encoding or decoding video data, the device comprising:
a memory configured to store video data;
one or more processors configured to:
- encode or decode, in accordance with a syntax table that specifies a parsing order for a coded video bitstream and using context adaptive binary arithmetic coding (CABAC) with a context, a syntax element via the coded video bitstream that indicates whether a transpose process is applied to palette indices of a current palette for a current block of video data;
- encode or decode, in accordance with the syntax table and via the coded video bitstream and using CABAC with a context, one or more syntax elements related to delta quantization parameter (QP) and/or chroma QP offsets for the current block of video data, wherein the syntax table specifies that the one or more syntax elements related to delta quantization parameter (QP) and/or chroma QP offsets for the current block of video data are parsed after the syntax element that indicates whether the transpose process is applied to palette indices of the current palette for the current block of video data;
- encode or decode, in accordance with the syntax table and via the coded video bitstream, a group of syntax elements using Bypass mode, wherein the group of syntax elements comprises:
  - one or more syntax elements that indicate a number of zeros that precede a non-zero entry in an array that indicates whether entries from a predictor palette are reused in the current palette;
  - a syntax element that indicates a number of entries in the current palette that are explicitly signalled;
  - one or more syntax elements that each indicate a value of a component in an entry in the current palette;

a syntax element that indicates whether the current block of video data includes at least one escape coded sample;
a syntax element that indicates a number of indices in the current palette that are explicitly signalled or inferred; and
one or more syntax elements that indicate indices in an array of entries of the current palette; and
encode or decode the current block of video data based on the current palette for the current block of video data, the group of syntax elements, and the one or more syntax elements related to delta QP and/or chroma QP offsets for the current block of video data.

18. The device of claim 17, wherein the syntax element that indicates whether the transpose process is applied to palette indices of the current palette of the current block of video data comprises a palette_transpose_flag syntax element.

19. The device of claim 17, wherein one or more of:
the one or more syntax elements that indicate a number of zeros that precede a non-zero entry in an array that indicates whether entries from a predictor palette are reused in the current palette comprise one or more palette_predictor_run syntax elements,
the syntax element that indicates a number of entries in the current palette that are explicitly signalled comprises a num_signalled_palette_entries syntax element,
the one or more syntax elements that each indicate a value of a component in an entry in the current palette comprise one or more palette_entry syntax elements,
the syntax element that indicates whether the current block of video data includes at least one escape coded sample comprises palette_escape_val_present_flag,
the syntax element that indicates a number of entries in the current palette that are explicitly signalled or inferred comprise a num_palette_indices_minus1 syntax element, and
the one or more syntax elements that indicate indices in an array of entries of the current palette comprise one or more palette_index_idc syntax elements.

20. The device of claim 17, wherein the syntax table specifies that the group of syntax elements are parsed via the coded video bitstream before the syntax element that indicates whether the transpose process is applied to palette indices of the current palette of the current block of video data.

21. The device of claim 17, wherein the one or more processors are further configured to:
encode or decode, in accordance with the syntax table and via the coded video bitstream, a syntax element that indicates a last occurrence of a run type flag within the current block of video data, wherein the syntax table specifies that the syntax element that indicates the last occurrence of the run type flag within the current block of video data is parsed after the group of syntax elements coded using Bypass mode.

22. The device of claim 21, wherein, to encode or decode the syntax element that indicates the last occurrence of a run type flag within the current block of video data, the one or more processors are configured to encode or decode the syntax element that indicates the last occurrence of a run type flag within the current block of video data using context adaptive binary arithmetic coding (CABAC) with a context.

23. A device for decoding video data, the device comprising:
means for parsing, in accordance with a syntax table that specifies a parsing order for a coded video bitstream and using context adaptive binary arithmetic coding (CABAC) with a context, a syntax element from the coded video bitstream that indicates whether a transpose process is applied to palette indices of a current palette for a current block of video data;
means for parsing, in accordance with the syntax table and from the coded video bitstream and using CABAC with a context, one or more syntax elements related to delta quantization parameter (QP) and/or chroma QP offsets for the current block of video data, wherein the syntax table specifies that the one or more syntax elements related to delta quantization parameter (QP) and/or chroma QP offsets for the current block of video data are parsed after the syntax element that indicates whether the transpose process is applied to palette indices of the current palette for the current block of video data;
means for parsing, in accordance with the syntax table and from the coded video bitstream, a group of syntax elements using Bypass mode, wherein the group of syntax elements comprises:
one or more syntax elements that indicate a number of zeros that precede a non-zero entry in an array that indicates whether entries from a predictor palette are reused in the current palette;
a syntax element that indicates a number of entries in the current palette that are explicitly signalled;
one or more syntax elements that each indicate a value of a component in an entry in the current palette;
a syntax element that indicates whether the current block of video data includes at least one escape coded sample;
a syntax element that indicates a number of indices in the current palette that are explicitly signalled or inferred; and
one or more syntax elements that indicate indices in an array of entries of the current palette; and
means for decoding the current block of video data based on the current palette for the current block of video data, the group of syntax elements, and the one or more syntax elements related to delta QP and/or chroma QP offsets for the current block of video data.

24. A non-transitory computer-readable storage medium storing at least a portion of a coded video bitstream that, when processed by a video decoding device in accordance with a syntax table, cause one or more processors of the video decoding device to:
determine whether a transpose process is applied to palette indices of a current palette for a current block of video data;
generate the current palette for the current block of video data based on:
one or more syntax elements that indicate a number of zeros that precede a non-zero entry in an array that indicates whether entries from a predictor palette are reused in the current palette;
a syntax element that indicates a number of entries in the current palette that are explicitly signalled;
one or more syntax elements that each indicate a value of a component in an entry in the current palette;
a syntax element that indicates whether the current block of video data includes at least one escape coded sample;
a syntax element that indicates a number of indices in the current palette that are explicitly signalled or inferred; and one or more syntax elements that indicate indices in an array of entries of the current palette; and decode the current block of the video data based on the current palette for the current block of video data and a delta quantization parameter (QP) and one or more chroma QP offsets for the current block of video data, wherein one or more syntax elements related to the delta QP and one or more syntax elements related to the one or more chroma QP offsets for the current block of video data are located at a position in the syntax table that is after a syntax element that indicates whether the transpose process is applied to palette indices of the current palette for the current block of video data, wherein the syntax element that indicates whether the transpose process is applied to palette indices of the current palette for the current block of video data is decoded using context adaptive binary arithmetic coding (CABAC) with a context, wherein at least one of the one or more syntax elements related to the delta QP and one or more syntax elements related to the one or more chroma QP offsets is decoded using CABAC with a context, and wherein the group of syntax elements are decoded using Bypass mode.

\* \* \* \* \*